United States Patent
Osumi et al.

(10) Patent No.: US 10,775,544 B2
(45) Date of Patent: Sep. 15, 2020

(54) DISPLAY DEVICE AND LIGHT GUIDE PLATE

(71) Applicant: Omron Corporation, Kyoto (JP)

(72) Inventors: Yoshimasa Osumi, Kyoto (JP); Masayuki Shinohara, Nagaokakyo (JP); Yoshihiko Takagi, Kyoto (JP); Norikazu Kitamura, Osaka (JP); Jun Kishimoto, Ogaki (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 16/614,721

(22) PCT Filed: Apr. 6, 2018

(86) PCT No.: PCT/JP2018/014789
§ 371 (c)(1),
(2) Date: Nov. 18, 2019

(87) PCT Pub. No.: WO2019/030980
PCT Pub. Date: Feb. 14, 2019

(65) Prior Publication Data
US 2020/0183073 A1 Jun. 11, 2020

(30) Foreign Application Priority Data
Aug. 10, 2017 (JP) .................. 2017-155789

(51) Int. Cl.
*F21V 8/00* (2006.01)
(52) U.S. Cl.
CPC ......... *G02B 6/0025* (2013.01); *G02B 6/0016* (2013.01); *G02B 6/0031* (2013.01);
(Continued)

(58) Field of Classification Search
CPC .. G02B 6/0025; G02B 6/0016; G02B 6/0031; G02B 6/0036; G02B 6/0038; G02B 6/0068; G02B 6/0058; G02B 6/006
See application file for complete search history.

(56) References Cited

U.S. PATENT DOCUMENTS 6,167,182 A * 12/2000 Shinohara ............ G02B 6/0036
385/129
6,671,013 B1 12/2003 Ohkawa
(Continued)

FOREIGN PATENT DOCUMENTS

JP   S48-10920 B1   4/1973
JP   2003-519810 A  6/2003
(Continued)

OTHER PUBLICATIONS

International Search Report issued in PCT/JP2018/014789 dated Jun. 12, 2018 (2 pages).
(Continued)

*Primary Examiner* — Julie A Bannan
*Assistant Examiner* — Michael Chiang
(74) *Attorney, Agent, or Firm* — Osha Liang LLP

(57) ABSTRACT

A display device includes a light guide plate 2 having at least one incoming surface and a plurality of light sources (3-1 to 3-4) arranged to face any of the incoming surfaces. The light guide plate 2 has a plurality of prisms 11 that is arrayed along each pattern in a plurality of patterns (21 to 24) displayed on one surface 2b of the light guide plate and reflects light emitted from a light source corresponding to the pattern and entering the light guide plate through the incoming surface toward a direction within a prescribed range of angles with reference to a direction normal to the other surface 2c of the light guide plate. Each prism 11 is formed as a triangular pyramid groove in one surface of the light guide plate 2, and one of inclined surfaces of the
(Continued)

triangular pyramid groove is formed as a reflective surface 11a that reflects light emitted from a light source corresponding to a pattern along which the prism is arrayed and entering the light guide plate.

6 Claims, 20 Drawing Sheets

(52) U.S. Cl.
CPC ......... *G02B 6/0036* (2013.01); *G02B 6/0058* (2013.01); *G02B 6/0068* (2013.01)

(56) References Cited

U.S. PATENT DOCUMENTS

| | | | |
|---|---|---|---|
| 9,703,033 B2* | 7/2017 | Zhou | G02B 6/0055 |
| 2001/0049893 A1 | 12/2001 | Maas et al. | |
| 2003/0046842 A1 | 3/2003 | Maas et al. | |
| 2005/0057915 A1* | 3/2005 | Tsai | G02B 6/0036 |
| | | | 362/600 |
| 2008/0291695 A1 | 11/2008 | Okayasu et al. | |
| 2010/0142225 A1* | 6/2010 | Kurihara | G02B 6/0036 |
| | | | 362/621 |
| 2010/0254158 A1 | 10/2010 | Harton et al. | |
| 2012/0051088 A1* | 3/2012 | Chui | G02B 6/006 |
| | | | 362/608 |
| 2012/0099343 A1* | 4/2012 | Ender | F21S 43/14 |
| | | | 362/613 |
| 2013/0265802 A1* | 10/2013 | Kamikatano | G02B 6/0055 |
| | | | 362/607 |
| 2014/0104885 A1 | 4/2014 | Zhang et al. | |
| 2015/0092441 A1 | 4/2015 | Takagi et al. | |
| 2015/0331173 A1* | 11/2015 | Wang | G02B 6/0066 |
| | | | 362/606 |
| 2017/0146721 A1 | 5/2017 | Fukui et al. | |

FOREIGN PATENT DOCUMENTS

| | | |
|---|---|---|
| JP | 2005-0268201 A | 9/2005 |
| JP | 2006-003431 A | 1/2006 |
| JP | 3946956 B2 | 7/2007 |
| JP | 2011-181221 A | 9/2011 |
| JP | 2015-087769 A | 5/2015 |
| JP | 2016-053605 A | 4/2016 |

OTHER PUBLICATIONS

Written Opinion of the International Searching Authority issued in in PCT/JP2018/014789 dated Jun. 12, 2018 (8 pages).
International Preliminary Report on Patentability from PCT/JP2018/014789 completed on Sep. 19, 2018 (6 pages).

* cited by examiner

DISPLAY DEVICE AND LIGHT GUIDE PLATE

TECHNICAL FIELD

The present invention relates to a display device capable of switching a displayed pattern, and a light guide plate used in such a display device.

BACKGROUND ART

Conventionally, a technique has been proposed for displaying a pattern according to a direction of light incident on a light guide plate which is formed into a plate shape and which has light transparency (see, for example, Patent Document 1).

For example, a light guide plate display device disclosed in Patent Document 1 includes a light guide plate, a plurality of light source devices provided along respective end faces of the light guide plate, and a plurality of prisms formed inside the light guide plate. The prisms respectively have a plurality of side surfaces facing the light source devices, and the side surfaces are respectively inclined in a thickness direction of the light guide plate at least in two stages by a transmissive inclined surface which transmits light radiated from the light source device, and a reflective inclined surface which reflects light radiated from the light source device and outputs the reflected light to a display surface of the light guide plate. Furthermore, a plurality of patterns is provided on the light guide plate. The prisms are formed such that, in each prism included in each pattern in the plurality of patterns, the area of the reflective inclined surface on the side surface facing the corresponding light source device is large and the area of the reflective inclined surface on the other side surfaces is small.

PRIOR ART DOCUMENTS

Patent Documents

Patent Document 1: Japanese Unexamined Patent Publication No. 2016-53605

SUMMARY OF THE INVENTION

Problems to be Solved by the Invention

In the light guide plate display device disclosed in Patent Document 1, a quantity of light reflected by the prisms disposed in a pattern corresponding to the light source device that emits light is greater than a quantity of light reflected by the prisms disposed in other patterns. Therefore, the displayed pattern can be switched by switching the light source device to be turned on. However, in this light guide plate display device, the prisms reflect a portion of light from the light source device different from the light source device corresponding to the prisms toward the display surface, so that, when any one of the light source devices is turned on, a pattern corresponding to the other light source devices may be displayed, although this pattern is darker than the pattern corresponding to the light source device.

In view of this, an object of the present invention is to provide a display device capable of reducing the visibility of a pattern other than a pattern corresponding to a light source that emits light in a plurality of patterns.

Means for Solving the Problem

As one aspect of the present invention, a display device is provided. The display device includes: a light guide plate that is formed of a transparent member, is capable of displaying a plurality of patterns, and has at least one incoming surface; a plurality of light sources arranged to face any of the at least one incoming surface; and a controller configured to control on and off of the plurality of light sources. The light guide plate has a plurality of prisms that is arrayed along each pattern in the plurality of patterns on one surface of the light guide plate and reflects visible light emitted from a light source corresponding to the pattern from among the plurality of light sources and entering the light guide plate through the incoming surface toward a direction within a prescribed range of angles with reference to a direction normal to the other surface of the light guide plate, each of the plurality of prisms is formed as a triangular pyramid groove in the one surface of the light guide plate, and one of inclined surfaces of the triangular pyramid groove is formed as a reflective surface configured to reflect light that is emitted from the light source corresponding to a pattern along which the prism is arrayed in the plurality of patterns and that enters the light guide plate toward the direction within the prescribed range of angles.

In this display device, it is preferable that, in each of the plurality of prisms, another inclined surface of the triangular pyramid groove is formed as a diffusion surface configured to reflect light that is emitted from a light source different from the light source corresponding to the pattern along which the prism is arrayed in the plurality of patterns and that enters the light guide plate toward an outside of the prescribed range of angles.

In this display device, it is preferable that the at least one incoming surface of the light guide plate includes a first incoming surface formed on one side surface of the light guide plate and a second incoming surface formed on a side surface of the light guide plate opposite to the first incoming surface, the plurality of light sources includes a first light source arranged to face the first incoming surface and a second light source arranged to face the second incoming surface, and the plurality of patterns includes a first pattern displayed when the first light source is turned on, and a second pattern displayed when the second light source is turned on. In this case, it is preferable that prisms included in the plurality of prisms and arrayed along the first pattern are formed such that an angle between the diffusion surface and the one surface of the light guide plate is increased with distance from the first light source.

In this case, it is also preferable that the prisms included in the plurality of prisms and arrayed along the first pattern are formed such that an angle between the diffusion surface and the second incoming surface is decreased with distance from the first light source on the one surface of the light guide plate.

Alternatively, it is preferable that, in this display device, the at least one incoming surface of the light guide plate includes a first incoming surface formed on one side surface of the light guide plate, and a second incoming surface formed on a side surface of the light guide plate opposite to the first incoming surface, and the plurality of light sources includes a first light source arranged to face the first incoming surface and a second light source arranged to face the second incoming surface. Further, a layer that suppresses reflection of light propagating through the light guide plate is preferably formed in a region of the first incoming surface that does not transmit light from the first light source.

Still alternatively, it is preferable that, in this display device, the at least one incoming surface of the light guide plate includes a first incoming surface formed on one side surface of the light guide plate, and a second incoming surface formed on a side surface of the light guide plate opposite to the first incoming surface, and the plurality of light sources includes a first light source arranged to face the first incoming surface and a second light source arranged to face the second incoming surface. The region of the first incoming surface that does not transmit light from the first light source is preferably tapered with respect to one surface or the other surface of the light guide plate.

Still alternatively, it is preferable that, in this display device, the at least one incoming surface of the light guide plate includes a first incoming surface formed on one side surface of the light guide plate, and a second incoming surface formed on a side surface of the light guide plate opposite to the first incoming surface, and the plurality of light sources includes a first light source arranged to face the first incoming surface and a second light source arranged to face the second incoming surface. It is also preferable that the display device further includes, between the first light source and the first incoming surface, a first collimating lens configured to collimate light emitted from the first light source in at least a longitudinal direction of the first incoming surface, the first collimating lens is arranged such that an optical axis of the first collimating lens is inclined with respect to a direction normal to the first incoming surface, and the first light source includes a light emitting element disposed on the optical axis of the first collimating lens.

As another aspect of the present invention, a display device is provided. The display device includes: a light guide plate that is formed of a transparent member, is capable of displaying a plurality of patterns, and has at least one incoming surface; a plurality of light sources arranged to face any of the at least one incoming surface; and a controller configured to control on and off of the plurality of light sources. The light guide plate has a plurality of prisms that is arrayed along each pattern in the plurality of patterns on one surface of the light guide plate and reflects visible light emitted from a light source corresponding to the pattern from among the plurality of light sources and entering the light guide plate through the incoming surface toward a direction within a prescribed range of angles with reference to a direction normal to the other surface of the light guide plate, each of the plurality of prisms is formed as a triangular prism groove in the one surface of the light guide plate, one of inclined surfaces of the triangular prism groove is formed as a reflective surface configured to reflect light that is emitted from the light source corresponding to a pattern along which the prism is arrayed in the plurality of patterns and that enters the light guide plate toward the direction within the prescribed range of angles, and an angle between one of the other inclined surfaces of the triangular prism groove and the one surface of the light guide plate is smaller than an angle between the reflective surface and the one surface of the light guide plate.

As still another aspect of the present invention, a light guide plate is provided. The light guide plate is formed of a transparent member, is capable of displaying a plurality of patterns, and has at least one incoming surface. The light guide plate has a plurality of prisms that is arrayed along each pattern in the plurality of patterns on one surface of the light guide plate and reflects light which is emitted from a light source corresponding to the pattern from among a plurality of light sources arranged to face any of the at least one incoming surface and which enters the light guide plate through the incoming surface toward a direction within a prescribed range of angles with reference to a direction normal to the other surface of the light guide plate, each of the plurality of prisms is formed as a triangular pyramid groove in the one surface of the light guide plate, and one of inclined surfaces of the triangular pyramid groove is formed as a reflective surface configured to reflect light that is emitted from the light source corresponding to a pattern along which the prism is arrayed in the plurality of patterns and that enters the light guide plate toward the direction within the prescribed range of angles.

Effect of the Invention

The display device according to the present invention has an effect of reducing the visibility of patterns other than the pattern corresponding to the light source that emits light in the plurality of patterns.

MODE FOR CARRYING OUT THE INVENTION

A display device according to an embodiment of the present invention will now be described with reference to the drawings. This display device has a light guide plate obtained by forming a material transparent to light emitted from a plurality of light sources into a plate shape, and one of the surfaces of the light guide plate is formed as an outgoing surface facing a viewer. Further, at least one of the side surfaces surrounding the outgoing surface of the light guide plate is formed as an incoming surface facing the plurality of light sources. A plurality of prisms that reflects light emitted from any one of the plurality of light sources and entering the light guide plate toward the outgoing surface is formed on the other surface of the light guide plate facing the outgoing surface. Each of the plurality of prisms is included in any of groups corresponding to any of the plurality of light sources, and the prisms in each group are arrayed in accordance with the shape of the pattern displayed by the display device. The prisms in each group are formed in a triangular pyramid shape, and are arrayed such that one of the three side surfaces other than the bottom surface is formed as a reflective surface, and the reflective surface faces the light source corresponding to the group. As a result, the prisms in each group reflect light from a light source other than the light source corresponding to the group on the side surfaces other than the reflective surface, thereby directing the light in a direction different from the direction toward the viewer positioned so as to face the outgoing surface. Thus, this display device reduces the visibility of patterns other than the pattern corresponding to the light source that emits light in the plurality of patterns.

In the following, for convenience of description, the side facing the viewer is defined as a front side and the opposite side is defined as a back side.

Figure 1:
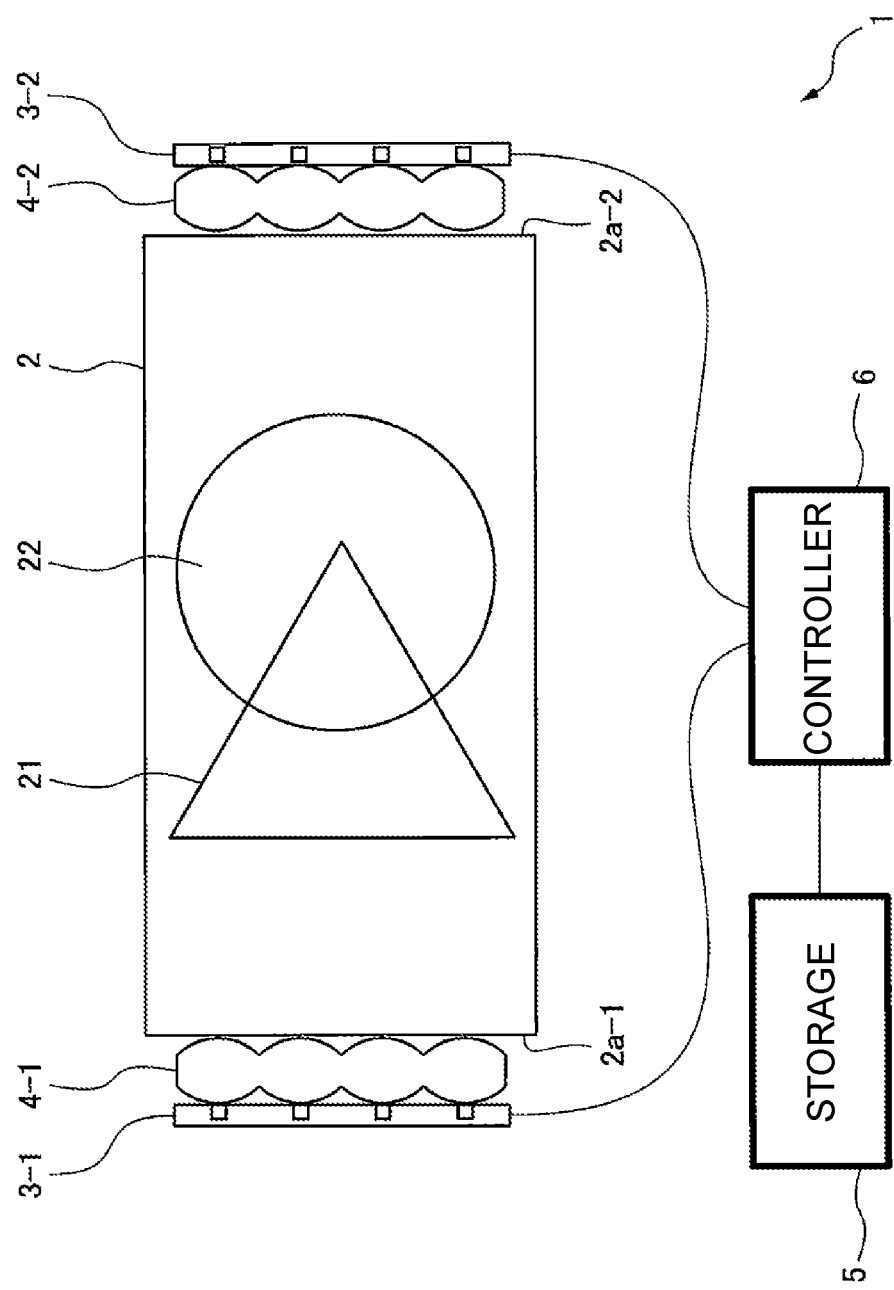
FIG. 1 is a diagram schematically showing a configuration of a display device according to one embodiment of the present invention.

FIG. 1 is a diagram schematically showing a configuration of a display device according to one embodiment of the present invention. The display device 1 includes a light guide plate 2, two light sources 3-1 and 3-2, collimating lenses 4-1 and 4-2, a storage 5, and a controller 6.

The light guide plate 2 is a plate-shaped member that is transparent to light emitted from the light sources 3-1 and 3-2. The light guide plate 2 is formed by molding a resin that is transparent to visible light, such as polymethyl methacrylate (PMMA), polycarbonate, or cycloolefin polymer. The light guide plate 2 is provided with two patterns 21 and 22 that can be displayed by turning on the light sources 3-1 and 3-2. That is, the light guide plate 2 propagates light from the light source 3-1 while the light source 3-1 is turned on, and reflects the light from the light source 3-1 toward the viewer positioned within a prescribed range of angles with reference to the direction normal to the outgoing surface on the front side by a plurality of prisms (the detail of which will be described later) arrayed on the back side so as to correspond to the light source 3-1 and to form the pattern 21, thereby enabling the viewer to view the luminous pattern 21. Similarly, the light guide plate 2 propagates light from the light source 3-2 while the light source 3-2 is turned on, and reflects the light from the light source 3-2 toward the viewer positioned within the prescribed range of angles with reference to the direction normal to the outgoing surface on the front side by a plurality of prisms arrayed on the back side so as to correspond to the light source 3-2 and to form the pattern 22, thereby enabling the viewer to view the luminous pattern 22.

The detail of the light guide plate 2 will be described later.

Each of the light sources 3-1 and 3-2 includes at least one light emitting element that emits visible light. In the embodiment, the light source 3-1 and the light source 3-2 are arranged so as to face each other with the light guide plate 2 interposed therebetween. The light emitting elements of the light source 3-1 are arranged in line along the longitudinal direction of an incoming surface 2a-1 such that light emitting surfaces thereof face the incoming surface 2a-1. The incoming surface 2a-1 is one of side surfaces of the light guide plate 2. On the other hand, the light emitting elements of the light source 3-2 are arranged in line along the longitudinal direction of an incoming surface 2a-2 such that light emitting surfaces thereof face the incoming surface 2a-2. The incoming surface 2a-2 is different one of the side surfaces of the light guide plate 2 and is the side surface opposite the incoming surface 2a-1.

The light sources 3-1 and 3-2 are turned on or off in response to a control signal from the controller 6, respectively. While the controller 6 turns on the light source 3-1, light emitted from the light source 3-1 is collimated by the collimating lens 4-1, and then enters the light guide plate 2 through the incoming surface 2a-1. The entered light propagates through the light guide plate 2, is then reflected by a plurality of prisms that form the pattern 21 and is provided on a diffusion surface 2b on the back side of the light guide plate 2, and is emitted from an outgoing surface 2c on the front side. Similarly, while the controller 6 turns on the light source 3-2, light emitted from the light source 3-2 is collimated by the collimating lens 4-2, and then enters the light guide plate 2 through the incoming surface 2a-2. The entered light propagates through the light guide plate 2, is then reflected by a plurality of prisms that form the pattern 22 and is provided on the diffusion surface 2b on the back side of the light guide plate 2, and is emitted from the outgoing surface 2c on the front side.

The light emitting elements included in the light sources 3-1 and 3-2 are, for example, light emitting diodes, incandescent lamps, or fluorescent lamps. The emission color of the light source 3-1 and the emission color of the light source 3-2 may be the same or different from each other. Further, the emission luminance of the light source 3-1 and the emission luminance of the light source 3-2 may be the same or different from each other.

The collimating lens 4-1 is disposed between the light source 3-1 and the incoming surface 2a-1, and collimates light emitted from the light emitting elements included in the light source 3-1. When the light source 3-1 has a plurality of light emitting elements arrayed in line along the longitudinal direction of the incoming surface 2a-1, the collimating lens 4-1 may also be formed as a lens array having a plurality of lenses arrayed in line along the longitudinal direction of the incoming surface 2a-1. The lenses are provided to correspond to the light emitting elements on a one-to-one basis. Each of the lenses collimates light emitted from the corresponding light emitting element so that the light perpendicularly enters the incoming surface 2a-1.

Similarly, the collimating lens 4-2 is disposed between the light source 3-2 and the incoming surface 2a-2, and collimates light emitted from the light emitting elements included in the light source 3-2. When the light source 3-2 has a plurality of light emitting elements arrayed in line along the longitudinal direction of the incoming surface 2a-2, the collimating lens 4-2 may also be formed as a lens array having a plurality of lenses arrayed in line along the longitudinal direction of the incoming surface 2a-2. The lenses are provided to correspond to the light emitting elements on a one-to-one basis. Each of the lenses collimates light emitted from the corresponding light emitting element so that the light perpendicularly enters the incoming surface 2a-2.

The collimating lenses 4-1 and 4-2 may be configured as refractive lenses or may be configured as diffractive lenses such as Fresnel zone plates. Further, the collimating lenses 4-1 and 4-2 may be cylindrical lenses that collimate light from the corresponding light source only in the longitudinal direction of the incoming surfaces 2a-1 and 2a-2.

The storage 5 includes, for example, a volatile or non-volatile memory circuit. The storage 5 stores turn-on control information indicating turn-on sequence or timings of turning on and off the light sources 3-1 and 3-2.

The controller 6 includes, for example, a processor and driving circuits for the light sources 3-1 and 3-2. The controller 6 controls on and off of the light sources 3-1 and 3-2 according to the turn-on control information.

For example, the controller 6 turns on the light source 3-1 and turns off the light source 3-2 for making only the pattern 21 visible to the viewer positioned within a prescribed range of angles with reference to the direction normal to the outgoing surface of the light guide plate 2 on the front side of the light guide plate 2. To make only the pattern 22 visible to the viewer, the controller 6 turns off the light source 3-1 and turns on the light source 3-2. To make both the pattern 21 and the pattern 22 visible to the viewer at the same time, the controller 6 only has to simultaneously turn on the light sources 3-1 and 3-2.

The timing at which the light sources 3-1 and 3-2 are turned on or off is designated by the turn-on control information. The turn-on control information can be, for example, data in which an identification number that identifies the light source to be turned on is simply represented according to the turn-on sequence of the light sources 3-1 and 3-2. For example, suppose that the identification number of the light source 3-1 is "1" and the identification number of the light source 3-2 is "2". Each light source is turned on for each preset period in the sequence of light source 3-1→light source 3-2, and each light source is turned on repeatedly at regular intervals. In this case, the turn-on control information may have the identification numbers in the sequence of "1" and "2".

The detail of the light guide plate 2 will be described below.

Figure 2:
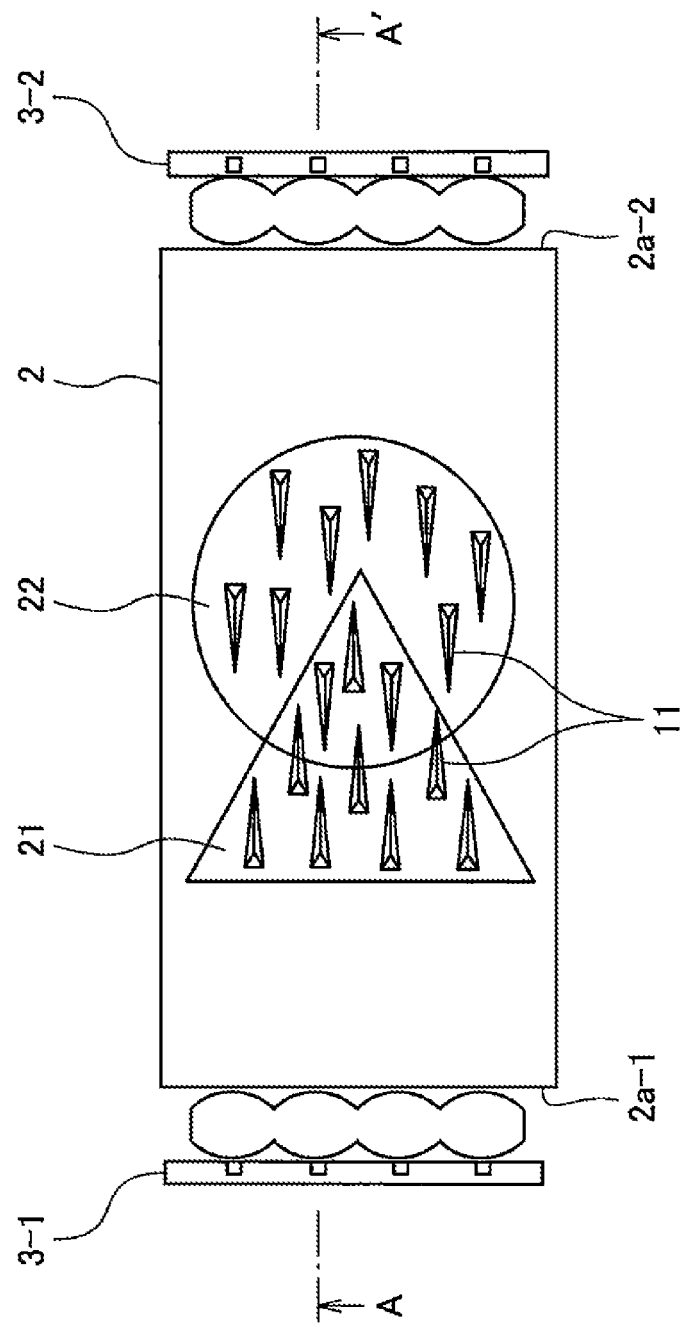
FIG. 2 is a schematic front view of a light guide plate included in the display device.
Figure 3:
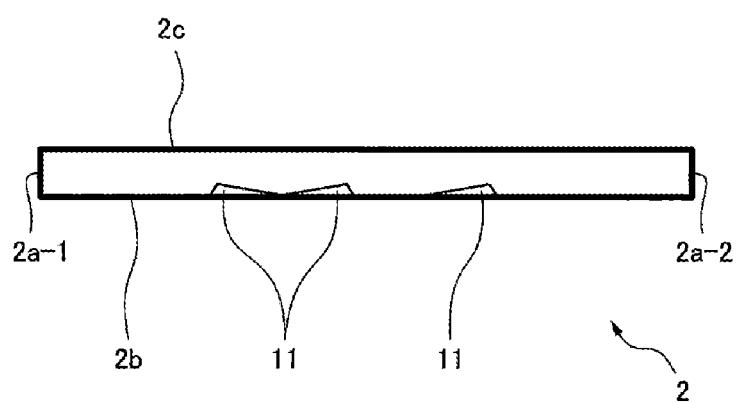
FIG. 3 is a schematic side sectional view of the light guide plate taken along a line indicated by an arrow AA' in FIG. 2.

FIG. 2 is a schematic front view of the light guide plate 2. FIG. 3 is a schematic side sectional view of the light guide plate 2 taken along a line indicated by an arrow AA' in FIG. 2. As shown in FIGS. 2 and 3, one of the side surfaces of the light guide plate 2 is formed as the incoming surface 2a-1 facing the light source 3-1. As described above, light emitted from the light source 3-1 enters the light guide plate 2 through the incoming surface 2a-1. Then, the light from the light source 3-1 propagating in the light guide plate 2 is totally reflected on the prisms which are included in a plurality of prisms 11 formed on the diffusion surface 2b on the back side of the light guide plate 2 and which are arrayed along the pattern 21, and then, is emitted through the outgoing surface 2c that is on the front side of the light guide plate 2 and on the opposite side of the diffusion surface 2b. At that time, the respective prisms arrayed along the pattern 21 reflect the light from the light source 3-1 toward a direction within a prescribed range of angles with reference to the direction normal to the outgoing surface 2c of the light guide plate 2. Therefore, the viewer can view the pattern 21 that appears to emit light on the surface of the light guide plate 2 while the light source 3-1 is turned on. It should be noted that, in FIGS. 2 and 3, the size of each prism and the thickness of the light guide plate 2 are exaggerated for clarity of drawings.

The side surface opposite to the incoming surface 2a-1 of the light guide plate 2 is formed as the incoming surface 2a-2 facing the light source 3-2. Light from the light source 3-2 entering the light guide plate 2 through the incoming surface 2a-2 and propagating in the light guide plate 2 is totally reflected on the prisms which are included in the plurality of prisms formed on the diffusion surface 2b and which are arrayed along the pattern 22, and then, is emitted through the outgoing surface 2c. At that time, the respective prisms arrayed along the pattern 22 reflect the light from the light source 3-2 toward the direction within the prescribed range of angles with reference to the direction normal to the outgoing surface 2c of the light guide plate 2. Therefore, the viewer can view the pattern 22 that appears to emit light on the surface of the light guide plate 2 while the light source 3-2 is turned on.

The prisms included in the plurality of prisms 11 and forming the pattern 21 are arrayed in a staggered or lattice pattern within the pattern 21, or randomly arrayed so that the array density of the prisms is constant within the pattern 21. Similarly, the prisms included in the plurality of prisms 11 and forming the pattern 22 are arrayed in a staggered or lattice pattern within the pattern 22, or randomly arrayed so that the array density of the prisms 11 is constant within the pattern 22.

In the region where the pattern 21 and the pattern 22 overlap, both the prisms that form the pattern 21 and the prisms that form the pattern 22 only has to be arrayed.

Note that the prisms 11 forming the pattern 21 and the prisms 11 forming the pattern 22 can be formed to have the same configuration except for only the orientation and arrangement.

Figure 4A:
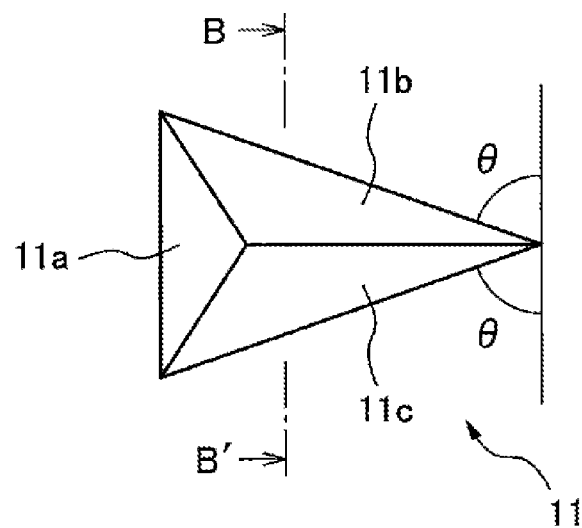
FIG. 4A is a schematic front view of a prism.
Figure 4B:
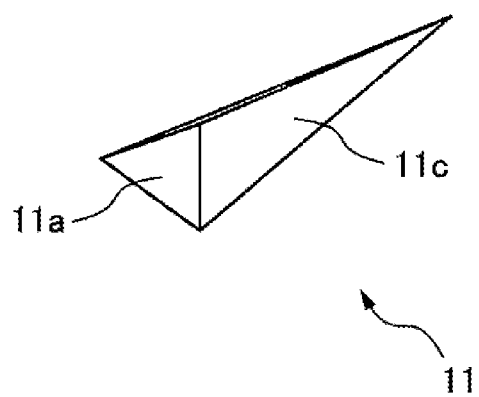
FIG. 4B is a schematic perspective view of the prism.
Figure 4C:
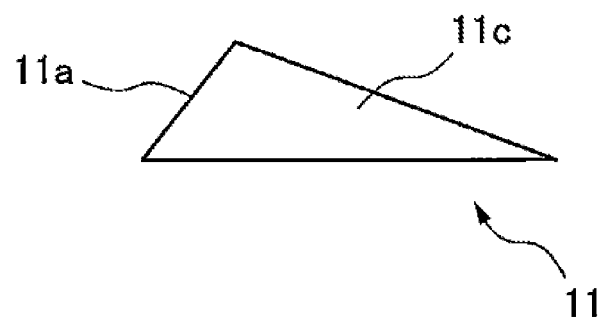
FIG. 4C is a schematic side view of the prism.
Figure 4D:
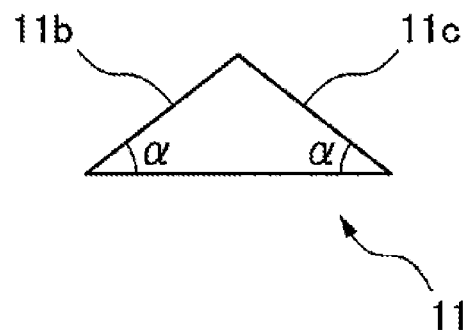
FIG. 4D is a schematic sectional view of the prism taken along a line BB' in FIG. 4A.

FIG. 4A is a schematic front view of the prism 11, and FIG. 4B is a schematic perspective view of the prism 11. FIG. 4C is a schematic side view of the prism 11. FIG. 4D is a schematic sectional view of the prism 11 along a line BB' in FIG. 4A. The prism 11 is formed, for example, as a triangular pyramid groove having the diffusion surface 2b as a bottom surface. One of the three inclined surfaces of the prism 11 is formed as a reflective surface 11a having a predetermined angle with respect to the diffusion surface 2b. The predetermined angle is set such that light from the corresponding light source (for example, the light source 3-1 in the case of prisms forming the pattern 21) entering the light guide plate 2 is totally reflected and directed in the direction within the prescribed range of angles with reference to the direction normal to the outgoing surface 2c. The other two of the three inclined surfaces of the prism 11 are formed as diffusion surfaces 11b and 11c that reflect light not from the corresponding light source (for example, light from the light source 3-2 in the case of prisms forming the pattern 21) toward a direction outside the prescribed range of angles with reference to the direction normal to the outgoing surface 2c so that the viewer cannot view the light.

Referring back to FIG. 2, the prisms included in the plurality of prisms 11 and forming the pattern 21 are arrayed such that the reflective surfaces 11a face any of the light emitting elements of the light source 3-1, that is, the reflective surfaces 11a and the incoming surface 2a-1 are substantially parallel to each other in a plane parallel to the diffusion surface 2b. Similarly, the prisms included in the plurality of prisms 11 and forming the pattern 22 are arrayed such that the reflective surfaces 11a face any of the light emitting elements of the light source 3-2, that is, the reflective surfaces 11a and the incoming surface 2a-2 are substantially parallel to each other in a plane parallel to the diffusion surface 2b.

As a result, light emitted from the light source 3-1, entering the light guide plate 2, and directed to any one of the prisms forming the pattern 21 is reflected by the reflective surface 11a of the prism and emitted through the outgoing surface 2c of the light guide plate 2 toward the viewer positioned on the front side of the light guide plate 2. On the other hand, light emitted from the light source 3-2, entering the light guide plate 2, and directed to any one of the prisms forming the pattern 21 is reflected by the diffusion surface 11b or 11c of the prism toward a direction outside the prescribed range of angles with reference to the direction normal to the outgoing surface 2c of the light guide plate 2 so as not to be visible to the viewer.

Here, the direction in which the light emitted from the light source 3-2 and entering the light guide plate 2 is reflected by the diffusion surface 11b or 11c of the prism is determined by a combination of an angle (hereinafter referred to as a rotation angle for convenience) θ between the direction perpendicular to the propagation direction of light from the light source 3-2, that is, the direction parallel to the incoming surface 2a-2, and the diffusion surface 11b or 11c of the prism, and an angle (hereinafter referred to as an inclination angle for convenience) α between the diffusion surface 2b of the light guide plate 2 and the diffusion surface 11b or 11c of the prism. Further, the angle of the reflected light with respect to the direction normal to the outgoing surface 2c when the reflected light is emitted from the light guide plate 2 is affected by the refractive index of the material of the light guide plate 2.

For example, suppose that the direction in which the viewer is positioned, that is, the prescribed range of angles with reference to the direction normal to the outgoing surface 2c of the light guide plate 2, is within 30° from the direction normal to the outgoing surface 2c of the light guide plate 2. In this case, when the light guide plate 2 is formed of polycarbonate (having a refractive index of 1.59) or PMMA (having a refractive index of 1.49), each prism 11 is preferably formed such that the rotation angle θ is within the range of 25° to 90° and the inclination angle α is within the range of 25° to 55° in order to cause the light emitted from the light source 3-2 and reflected by the prism 11 to be directed in a direction outside the prescribed range of angles to prevent the light from being directed to the viewer.

Further, suppose that the prescribed range of angles with reference to the direction normal to the outgoing surface 2c of the light guide plate 2 is within 45° from the direction normal to the outgoing surface 2c of the light guide plate 2. In this case, when the light guide plate 2 is formed of polycarbonate or PMMA, each prism 11 is preferably formed such that the rotation angle θ is within the range of 35° to 90° and the inclination angle α is within the range of 25° to 55° in order to cause the light emitted from the light source 3-2 and reflected by the prism 11 to be directed in a direction outside the prescribed range of angles.

Furthermore, suppose that the prescribed range of angles with reference to the direction normal to the outgoing surface 2c of the light guide plate 2 is within 60° from the direction normal to the outgoing surface 2c of the light guide plate 2. In this case, when the light guide plate 2 is formed of polycarbonate or PMMA, each prism 11 is preferably formed such that the rotation angle θ is within the range of 40° to 90° and the inclination angle α is within the range of 25° to 55° in order to cause the light emitted from the light source 3-2 and reflected by the prism 11 to be directed in a direction outside the prescribed range of angles.

The rotation angle and inclination angle of the diffusion surfaces of the prisms 11 in the pattern 22 may be set similarly.

As described above, in this display device, a plurality of prisms is arranged along each pattern in the plurality of patterns formed on the light guide plate. Each prism is formed into a triangular pyramid shape, and one of the three inclined surfaces is formed as a reflective surface that reflects light emitted from the corresponding light source and propagating through the light guide plate toward the viewer positioned on the front side of the light guide plate, while the remaining two inclined surfaces reflect light from the other light sources in a direction different from the direction in which the viewer is positioned. Therefore, this display device can reduce the visibility of patterns other than the pattern to be displayed corresponding to the light source that emits light in the plurality of patterns. In particular, this display device can reduce the visibility of patterns other than the pattern to be displayed even if a plurality of patterns is closely arranged or arranged so as to overlap each other.

Note that, according to a modification, the collimating lens may not be provided.

Figure 5:
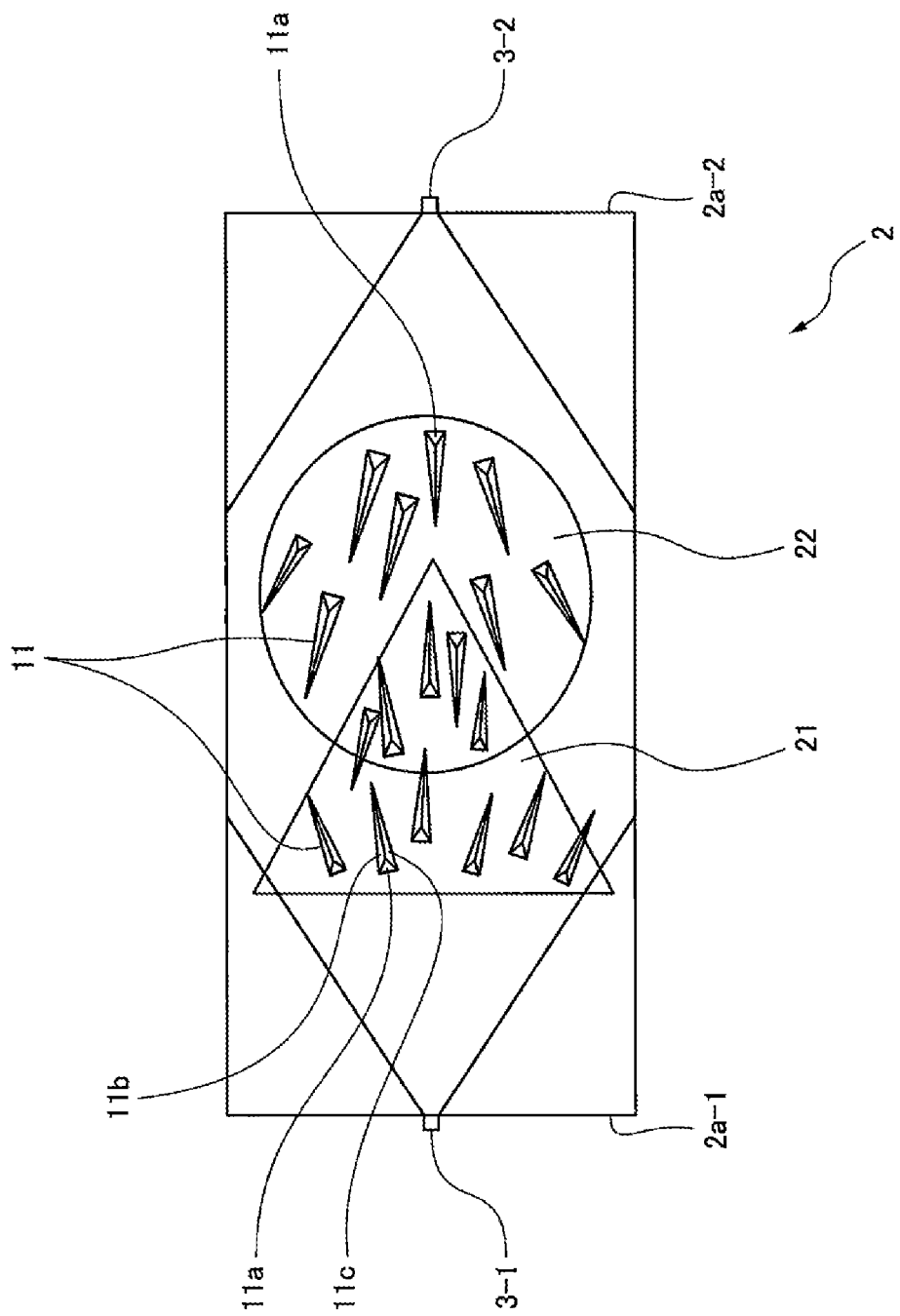
FIG. 5 is a schematic front view of a light guide plate according to a modification.

FIG. 5 is a schematic front view of a light guide plate 2 according to the modification. In this modification, a light source 3-1 and a light source 3-2 each have one light emitting element. Light emitted from the light source 3-1 enters the light guide plate 2 through an incoming surface 2a-1. The entered light spreads in a direction parallel to the incoming surface 2a-1 while propagating through the light guide plate 2. Similarly, light emitted from the light source 3-2 enters the light guide plate 2 through an incoming surface 2a-2. The entered light spreads in a direction parallel to the incoming surface 2a-2 while propagating through the light guide plate 2.

In this modification, prisms 11 forming a pattern 21 are preferably arrayed such that reflective surfaces 11a face the light source 3-1, that is, the reflective surfaces 11a are positioned along an arc around the light source 3-1 in a plane parallel to a diffusion surface 2b of the light guide plate 2. Accordingly, the prisms 11 can reflect light emitted from the light source 3-1 and entering the light guide plate 2 toward a viewer positioned within a prescribed range of angles with reference to the direction normal to an outgoing surface 2c on the front side of the light guide plate 2, regardless of positions within the pattern 21. On the other hand, light emitted from the light source 3-2 and entering the light guide plate 2 is reflected by the diffusion surface 11b or 11c of each prism 11 in a direction different from the direction in which the viewer is positioned, that is, in a direction outside the prescribed range of angles with reference to the direction normal to the outgoing surface 2c.

The prisms 11 forming the pattern 22 may be arrayed in the same manner as the prisms 11 forming the pattern 21. That is, the prisms 11 forming the pattern 22 are preferably arrayed such that the reflective surfaces 11a face the light source 3-2, that is, the reflective surfaces 11a are positioned along an arc around the light source 3-2 in a plane parallel to the diffusion surface 2b of the light guide plate 2.

According to another modification, two adjacent side surfaces of the light guide plate may be formed as incoming surfaces, respectively. Light sources may be provided so as to face the two incoming surfaces, respectively.

Further, the number of incoming surfaces and the number of light sources provided on the light guide plate are not limited to two.

Figure 6:
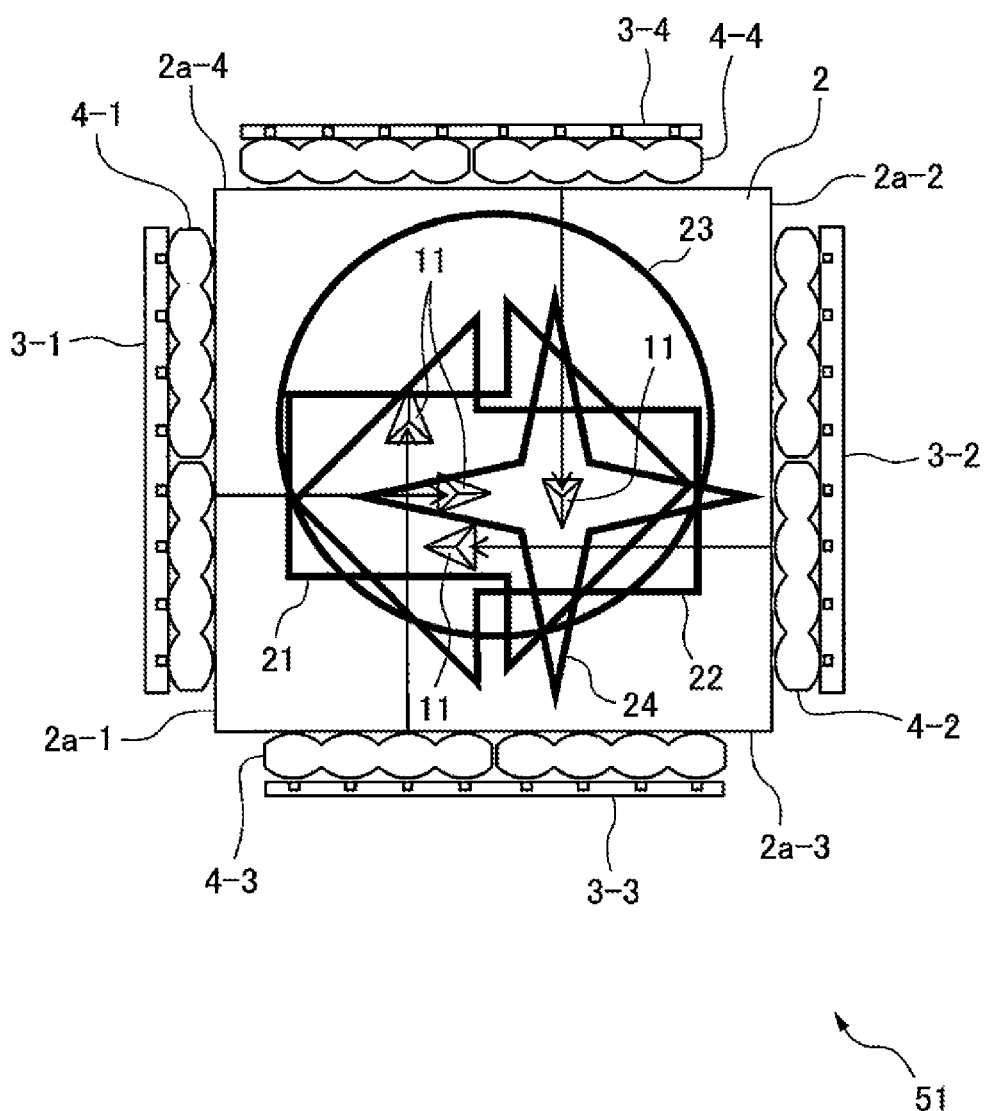
FIG. 6 is a schematic front view of a display device according to a modification.

FIG. 6 is a schematic front view of a display device 51 according to this modification. Note that a storage and a controller are not shown in FIG. 6. The display device 51 according to this modification is different from the display device 1 according to the above embodiment in the structure of a light guide plate and the number and arrangement of light sources and collimating lenses. Therefore, the light guide plate, the light source, and the collimating lens will be described below.

In this modification, the side surfaces of the light guide plate 2 of the display device 51 are formed as incoming surfaces 2a-1 to 2a-4, respectively. The display device 51 includes four light sources 3-1 to 3-4 and four collimating lenses 4-1 to 4-4. The light source 3-1 is disposed so as to face the incoming surface 2a-1. Light emitted from the light source 3-1 is collimated by the collimating lens 4-1 disposed between the light source 3-1 and the incoming surface 2a-1, and then enters the light guide plate 2 through the incoming surface 2a-1.

Similarly, the light source 3-2 is disposed so as to face the incoming surface 2a-2 formed on the side opposite the incoming surface 2a-1. Light emitted from the light source 3-2 is collimated by the collimating lens 4-2 disposed between the light source 3-2 and the incoming surface 2a-2, and then enters the light guide plate 2 through the incoming surface 2a-2. The light source 3-3 is disposed so as to face the incoming surface 2a-3 formed on the side surface adjacent to the incoming surface 2a-1 and the incoming surface 2a-2. Light emitted from the light source 3-3 is collimated by the collimating lens 4-3 disposed between the light source 3-3 and the incoming surface 2a-3, and then enters the light guide plate 2 through the incoming surface 2a-3. Further, the light source 3-4 is disposed so as to face the incoming surface 2a-4 formed on the side opposite the incoming surface 2a-3. Light emitted from the light source 3-4 is collimated by the collimating lens 4-4 disposed between the light source 3-4 and the incoming surface 2a-4, and then enters the light guide plate 2 through the incoming surface 2a-4.

In this modification, four patterns 21 to 24 are formed on the light guide plate 2. In each pattern, a plurality of prisms 11 is arrayed. In FIG. 6, only one prism 11 is shown for each pattern for simplification. Each prism 11 is formed in a triangular pyramid shape as in the above embodiment. The pattern 21 corresponds to the light source 3-1, and each prism 11 arrayed in the pattern 21 is formed so that a reflective surface 11a faces the light source 3-1. Similarly, the pattern 22 corresponds to the light source 3-2, and each prism 11 arrayed in the pattern 22 is formed so that the reflective surface 11a faces the light source 3-2. The pattern 23 corresponds to the light source 3-3, and each prism 11 arrayed in the pattern 23 is formed so that the reflective surface 11a faces the light source 3-3. The pattern 24 corresponds to the light source 3-4, and each prism 11 arrayed in the pattern 24 is formed so that the reflective surface 11a faces the light source 3-4.

Therefore, when the light source 3-1 is turned on, light emitted from the light source 3-1 and entering the light guide plate 2 is reflected by the reflective surface 11a of each prism 11 arrayed in the pattern 21, and emitted through the outgoing surface 2c of the light guide plate 2. On the other hand, each of the prisms 11 in the patterns 22 to 24 reflects light emitted from the light source 3-1 toward a direction outside a prescribed range of angles with reference to the direction normal to the outgoing surface 2c by the diffusion surface 11b or 11c. Therefore, when the light source 3-1 is turned on, the pattern 21 is visible to a viewer positioned on the front side of the light guide plate 2. On the other hand, the patterns 22 to 24 are invisible to the viewer.

Similarly, when the light source 3-2 is turned on, light emitted from the light source 3-2 and entering the light guide plate 2 is reflected by the reflective surface 11a of each prism 11 arrayed in the pattern 22, and emitted through the outgoing surface 2c of the light guide plate 2. On the other hand, each of the prisms 11 in the patterns 21, 23, and 24 reflects light emitted from the light source 3-2 toward the direction outside the prescribed range of angles with reference to the direction normal to the outgoing surface 2c by the diffusion surface 11b or 11c. Therefore, when the light source 3-2 is turned on, only the pattern 22 in the patterns 21 to 24 is visible to the viewer positioned on the front side of the light guide plate 2.

In addition, when the light source 3-3 is turned on, light emitted from the light source 3-3 and entering the light guide plate 2 is reflected by the reflective surface 11a of each prism 11 arrayed in the pattern 23, and emitted through the outgoing surface 2c of the light guide plate 2. On the other hand, each of the prisms 11 in the patterns 21, 22, and 24 reflects light emitted from the light source 3-3 toward the direction outside the prescribed range of angles with reference to the direction normal to the outgoing surface 2c by the diffusion surface 11b or 11c. Therefore, when the light source 3-3 is turned on, only the pattern 23 in the patterns 21 to 24 is visible to the viewer positioned on the front side of the light guide plate 2.

Further, when the light source 3-4 is turned on, light emitted from the light source 3-4 and entering the light guide plate 2 is reflected by the reflective surface 11a of each prism 11 arrayed in the pattern 24, and emitted through the outgoing surface 2c of the light guide plate 2. On the other hand, each of the prisms 11 in the patterns 21 to 23 reflects light emitted from the light source 3-4 toward the direction outside the prescribed range of angles with reference to the direction normal to the outgoing surface 2c by the diffusion surface 11b or 11c. Therefore, when the light source 3-4 is turned on, only the pattern 24 in the patterns 21 to 24 is visible to the viewer positioned on the front side of the light guide plate 2.

In this modification, in order to simultaneously display two or more of the patterns 21 to 24, the controller 6 only has to simultaneously turn on two or more of the light sources corresponding to the patterns to be displayed among the light sources 3-1 to 3-4.

In this modification, suppose that the prescribed range of angles with reference to the direction normal to the outgoing surface 2c of the light guide plate 2 is, for example, within 30° from the direction normal to the outgoing surface 2c of the light guide plate 2. In this case, when the light guide plate 2 is formed of polycarbonate (having a refractive index of 1.59) or PMMA (having a refractive index of 1.49), each prism 11 is preferably formed such that the rotation angle θ of the diffusion surfaces 11b and 11c is within the range of 25° to 65° and the inclination angle α of the diffusion surfaces 11b and 11c is within the range of 25° to 55° in order to cause the light emitted from light sources other than the corresponding light source and reflected by the diffusion surface 11b or 11c of the prism 11 to be directed in a direction outside the prescribed range of angles to prevent the light from being directed to the viewer.

Further, suppose that the prescribed range of angles with reference to the direction normal to the outgoing surface 2c of the light guide plate 2 is within 45° from the direction normal to the outgoing surface 2c of the light guide plate 2. In this case, when the light guide plate 2 is formed of polycarbonate or PMMA, each prism 11 is preferably formed such that the rotation angle θ is within the range of 35° to 55° and the inclination angle α is within the range of 25° to 55° in order to cause the light emitted from light sources other than the corresponding light source and reflected by the diffusion surface 11*b* or 11*c* of the prism 11 to be directed in a direction outside the prescribed range of angles.

Furthermore, suppose that the prescribed range of angles with reference to the direction normal to the outgoing surface 2*c* of the light guide plate 2 is within 60° from the direction normal to the outgoing surface 2*c* of the light guide plate 2. In this case, when the light guide plate 2 is formed of polycarbonate or PMMA, each prism 11 is preferably formed such that the rotation angle θ is within the range of 40° to 50° and the inclination angle α is within the range of 25° to 55° in order to cause the light emitted from light sources other than the corresponding light source and reflected by the diffusion surface 11*b* or 11*c* of the prism 11 to be directed in a direction outside the prescribed range of angles.

Similar to the display device according to the above-described embodiment, the display device according to this modification can also reduce the visibility of patterns other than the pattern corresponding to the light source that emits light in the plurality of patterns.

Each of the prisms arrayed in the region where two patterns corresponding to light beams from two directions entering through two mutually orthogonal incoming surfaces overlap may be formed such that the inclined surfaces facing the two directions are respectively formed as reflective surfaces. Similarly, each of the prisms arrayed in the region where four patterns corresponding to light beams from four directions overlap may be formed to have a quadrangular pyramid shape with the respective inclined surfaces being formed as reflective surfaces.

Figure 7:
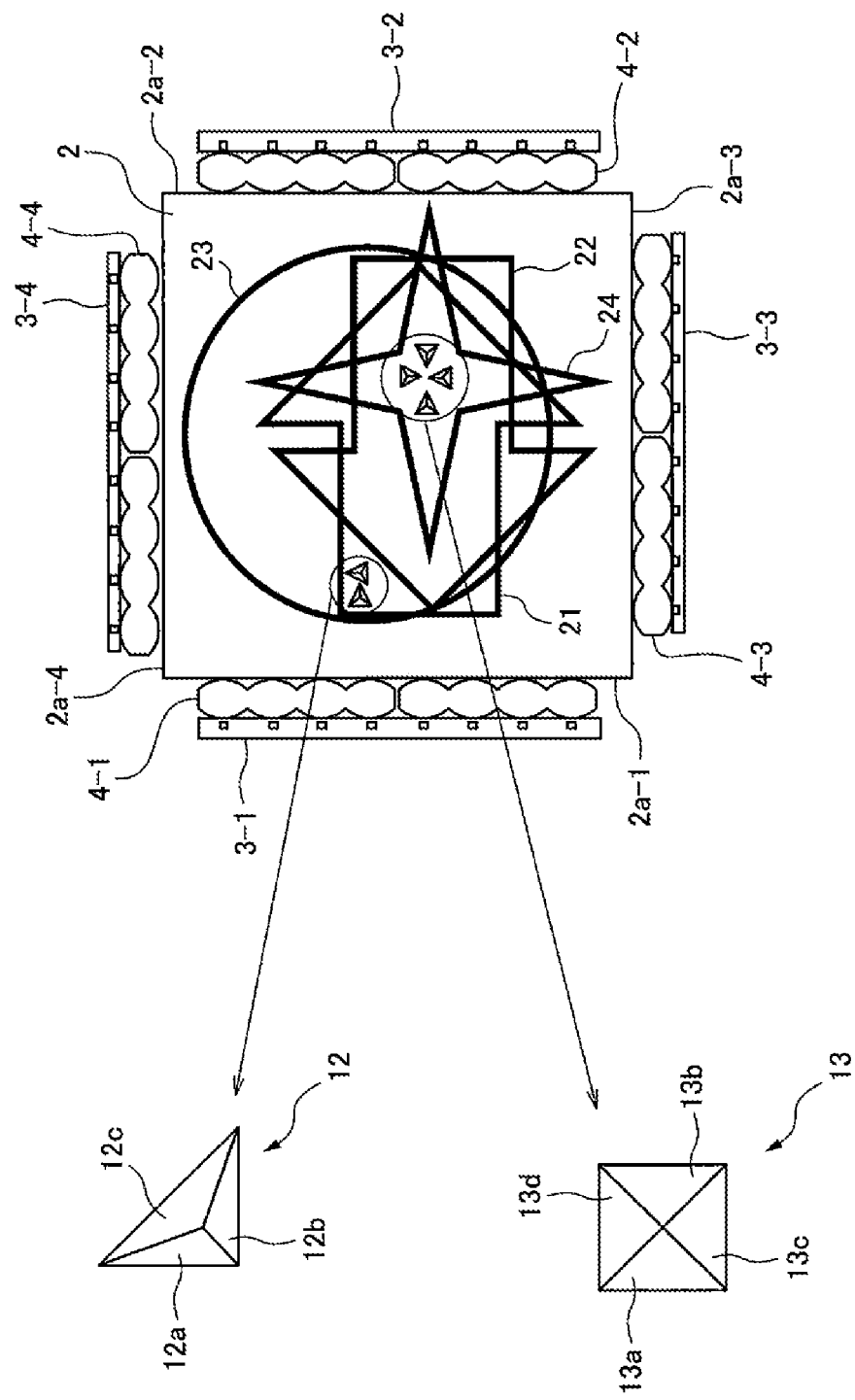
FIG. 7 is a diagram showing an example of the shape of a prism according to a modification.

FIG. 7 is a diagram showing an example of the shape of the prism according to this modification. In this example, similar to the display device 51 shown in FIG. 6, the side surfaces of a light guide plate 2 are formed as incoming surfaces 2*a*-1 to 2*a*-4, respectively. Four light sources 3-1 to 3-4 are disposed so as to face the incoming surfaces 2*a*-1 to 2*a*-4 via collimating lenses 4-1 to 4-4, respectively.

Prisms arrayed in the region where a pattern 21 and a pattern 23 overlap preferably reflect light emitted from the light source 3-1 corresponding to the pattern 21 and entering the light guide plate 2 and light emitted from the light source 3-3 corresponding to the pattern 23 and entering the light guide plate 2 toward a viewer positioned within a prescribed range of angles with reference to the direction normal to an outgoing surface 2*c* on the front side of the light guide plate 2. Therefore, in the region where the pattern 21 and the pattern 23 overlap, a prism 12 which is formed into a triangular pyramid shape and in which two of the three inclined surfaces are formed as reflective surfaces 12*a* and 12*b* may be used, in place of the prism 11 formed such that the reflective surface 11*a* faces the light source 3-1 and the prism 11 formed such that the reflective surface 11*a* faces the light source 3-3. In this example, the reflective surface 12*a* of the prism 12 is formed to face the light source 3-1, and the reflective surface 12*b* is formed to face the light source 3-3. Therefore, on the diffusion surface 2*b* of the light guide plate 2, the reflective surface 12*a* and the reflective surface 12*b* are orthogonal to each other. The remaining one of the three inclined surfaces of the prism 12 is formed as a diffusion surface 12*c* which is inclined with respect to the direction in which light from the light source 3-2 propagates and the direction in which light from the light source 3-4 propagates. Thus, the prism 12 reflects light emitted from the light source 3-1 and entering the light guide plate 2 toward the viewer positioned on the front side of the light guide plate 2 by the reflective surface 12*a*, and light emitted from the light source 3-3 and entering the light guide plate 2 toward the viewer positioned on the front side of the light guide plate 2 by the reflective surface 12*b*. On the other hand, light emitted from the light source 3-2 or the light source 3-4 and entering the light guide plate 2 is reflected toward a direction outside the prescribed range of angles with reference to the direction normal to the outgoing surface 2*c* by the diffusion surface 12*c*.

Further, the prisms arrayed in the region where the patterns 21 to 24 all overlap preferably reflect light beams emitted from the light sources respectively corresponding to the patterns 21 to 24 and entering the light guide plate 2 toward the viewer positioned within the prescribed range of angles with reference to the direction normal to the outgoing surface 2*c* on the front side of the light guide plate 2. Therefore, in the region where the patterns 21 to 24 all overlap, a prism 13 which is formed into a quadrangular pyramid shape and in which four inclined surfaces are respectively formed as reflective surfaces 13*a* to 13*d* may be used, in place of four prisms 11 formed such that the reflective surfaces 11*a* thereof face the light sources 3-1 to 3-4, respectively. The prism 13 is formed so that the reflective surfaces 13*a* to 13*d* face the light sources 3-1 to 3-4, respectively. Accordingly, light beams emitted from the light sources 3-1 to 3-4 and entering the light guide plate 2 are reflected by the prism 13 and travels toward the viewer positioned on the front side of the light guide plate 2.

According to this modification, the display device can reduce the number of prisms arrayed in a region where multiple patterns overlap. Therefore, the processing of the light guide plate is facilitated. Moreover, due to the decrease in number of the prisms in the region where multiple patterns overlap, a decrease in the density of the reflective surface of the prism per light source can be suppressed, whereby a decrease in brightness of the region where the multiple patterns overlap can be suppressed.

If a prism forming any one of a plurality of patterns formed on a light guide plate as in the above embodiment or modifications reflects light from a light source other than the light source corresponding to the pattern by the diffusion surface, the reflected light may propagate through the light guide plate as stray light. In such a case, the stray light may be reflected by another prism and emitted toward the viewer.

Figure 8:
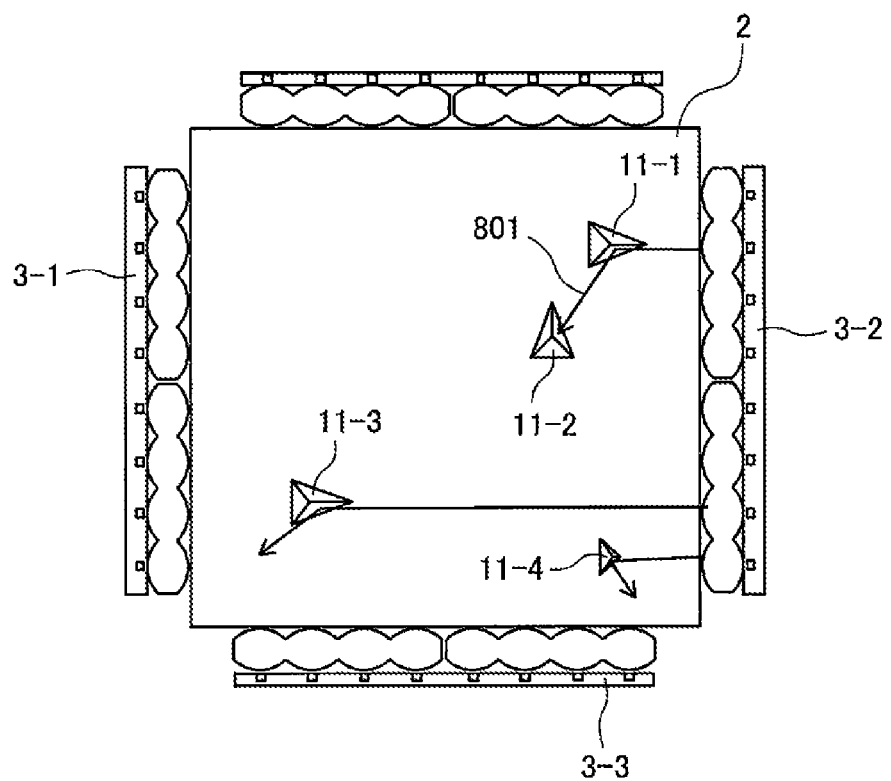
FIG. 8 is a diagram showing an example in which stray light reflected by a prism is reflected by another prism and emitted toward a viewer.

FIG. 8 is a diagram showing an example in which stray light reflected by a prism is reflected by another prism and emitted toward the viewer. In this example, light emitted from a light source 3-2 and entering a light guide plate 2 is reflected by the diffusion surface of a prism 11-1 that forms a pattern displayed by a light source 3-1, as indicated by an arrow 801, and this light becomes stray light. Then, the stray light propagates through the light guide plate 2 and is reflected again by the diffusion surface of a prism 11-2 that forms a pattern displayed by a light source 3-3, and is emitted through an outgoing surface 2*c* of the light guide plate 2 toward the viewer.

In order to suppress an occurrence of such stray light, it is preferable that the light reflected by the diffusion surface of the prism is immediately emitted from the light guide plate 2 without propagating through the light guide plate 2 as much as possible. In view of this, for example, it is preferable that the prism farther from the corresponding light source, that is, the prism closer to the light source disposed on the side opposite the corresponding light source, is formed to have a larger inclination angle α or a smaller rotation angle θ. For example, it is preferable that, in the pattern displayed by the light source 3-1, a prism closer to the light source 3-2 (that is, the incoming surface 2*a*-2) is formed to have a larger inclination angle α or a smaller rotation angle θ, as indicated by prisms 11-3 and 11-4.

As the inclination angle α is larger (within the above-mentioned range of inclination angle by which light reflected by the diffusion surface of the prism is directed toward the direction outside the prescribed range of angles with reference to the direction normal to the outgoing surface 2c), the angle between the light reflected by the diffusion surface of the prism and the outgoing surface 2c is increased, whereby the reflected light is not totally reflected on the outgoing surface 2c. For this reason, the light reflected by the diffusion surface of the prism is prevented from becoming stray light. Further, as the rotation angle θ is smaller, the light reflected by the diffusion surface of the prism is reflected toward a direction closer to the incoming surface on which the reflected light is incident. Therefore, the configuration in which the prism closer to the light source disposed on the side opposite the corresponding light source has a smaller rotation angle θ prevents the light reflected by the diffusion surface of the prism from being directed to the center of the light guide plate 2.

In addition, a portion of light that enters the light guide plate through any of incoming surfaces and is not reflected by the prism may be reflected by the incoming surface of the light guide plate on the side opposite the incoming surface on which the light is incident. In such a case, the reflected light may be reflected by a prism that forms a pattern displayed by light from another light source through the incoming surface on the side opposite the incoming surface on which the light is incident, and may be directed to the viewer.

Figure 9A:
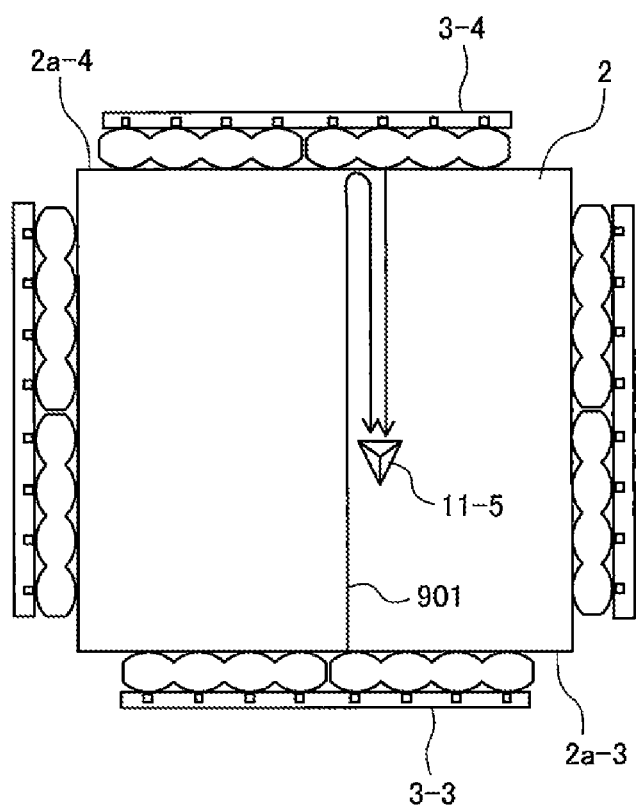
FIG. 9A is a view for describing an example in which light reflected by an incoming surface on the side opposite to the incoming surface on which light is incident is reflected by a prism and emitted toward a viewer.

FIG. 9A is a view for describing an example in which light reflected by an incoming surface on the side opposite the incoming surface on which the light is incident is reflected by a prism and emitted toward a viewer. In this example, as indicated by an arrow 901, a portion of light emitted from the light source 3-3 and entering the light guide plate 2 through the incoming surface 2a-3 is reflected by the incoming surface 2a-4 which is on the side opposite the incoming surface 2a-3. Then, the reflected light is reflected by a prism 11-5 in a pattern displayed by the light source 3-4 disposed to face the incoming surface 2a-4, and is emitted toward the viewer through the outgoing surface 2c of the light guide plate 2.

Figure 9B:
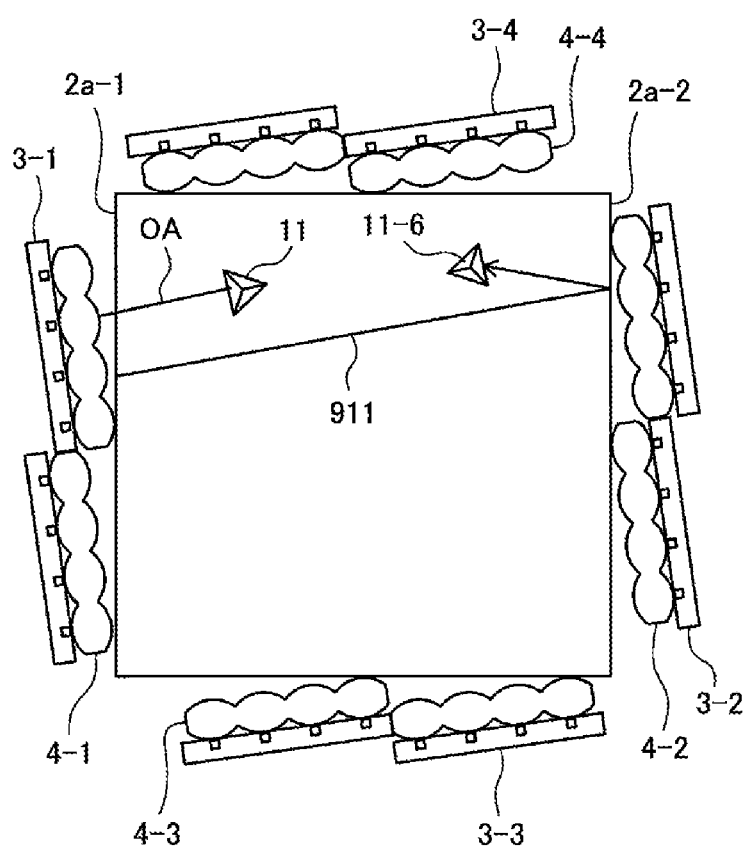
FIG. 9B is a schematic front view of a modification of the display device shown in FIG. 6.

FIG. 9B is a schematic front view showing a modification of the display device shown in FIG. 6 for preventing such reflected light from being emitted from the light guide plate toward the viewer. Note that a storage and a controller are not shown in FIG. 9B. According to this modification, each of the collimating lenses 4-1 to 4-4 is disposed such that the optical axis OA thereof is inclined with respect to the direction normal to the corresponding incoming surface. The two collimating lenses facing each other with the light guide plate 2 interposed therebetween are preferably inclined in the same direction with respect to the longitudinal direction of the corresponding incoming surfaces. The light emitting elements of each of the light sources 3-1 to 3-4 are disposed on the optical axis OA of the corresponding one of the collimating lenses. Each of the prisms 11 is also arrayed to face the corresponding light source so that the reflective surface 11a of the prism 11 is orthogonal to the optical axis OA in a plane parallel to the diffusion surface 2b of the light guide plate 2.

Therefore, light emitted from each light source and collimated by the corresponding collimating lens is incident along the direction parallel to the optical axis OA, that is, obliquely incident on the incoming surface. For example, as indicated by an arrow 911, light emitted from the light source 3-1 is collimated by the collimating lens 4-1, and then obliquely enters the incoming surface 2a-1. Therefore, even if the entered light is reflected by the incoming surface 2a-2 on the side opposite the incoming surface 2a-1, the reflected light is directed in a direction inclined with respect to the direction normal to the incoming surface 2a-2 by an angle same as the angle between the optical axis OA and the incoming surface 2a-1. The reflected light enters the reflective surface of the prism 11-6 in the pattern displayed by the light source 3-2 such that the angle between the normal direction and the reflected light is double the angle between the optical axis OA and the incoming surface 2a-1. Therefore, the reflected light is emitted toward a direction outside a prescribed range of angles with reference to the direction normal to the outgoing surface 2c of the light guide plate 2, and thus, is not viewed by the viewer.

Figure 10A:
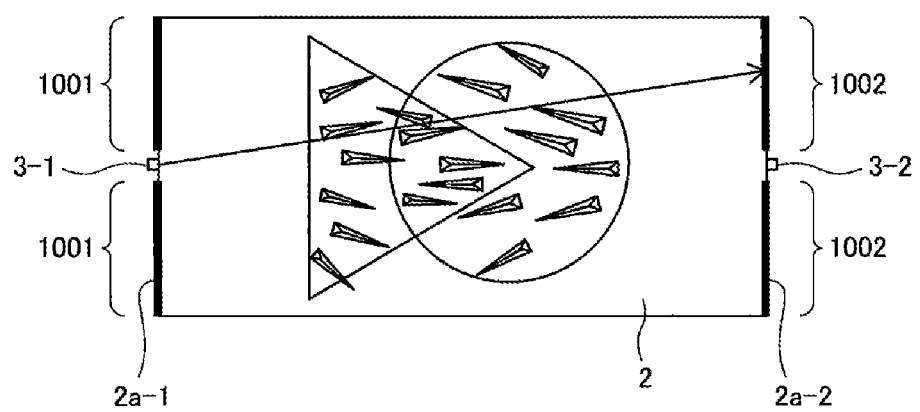
FIG. 10A is a schematic front view of a light guide plate according to still another modification.
Figure 10B:
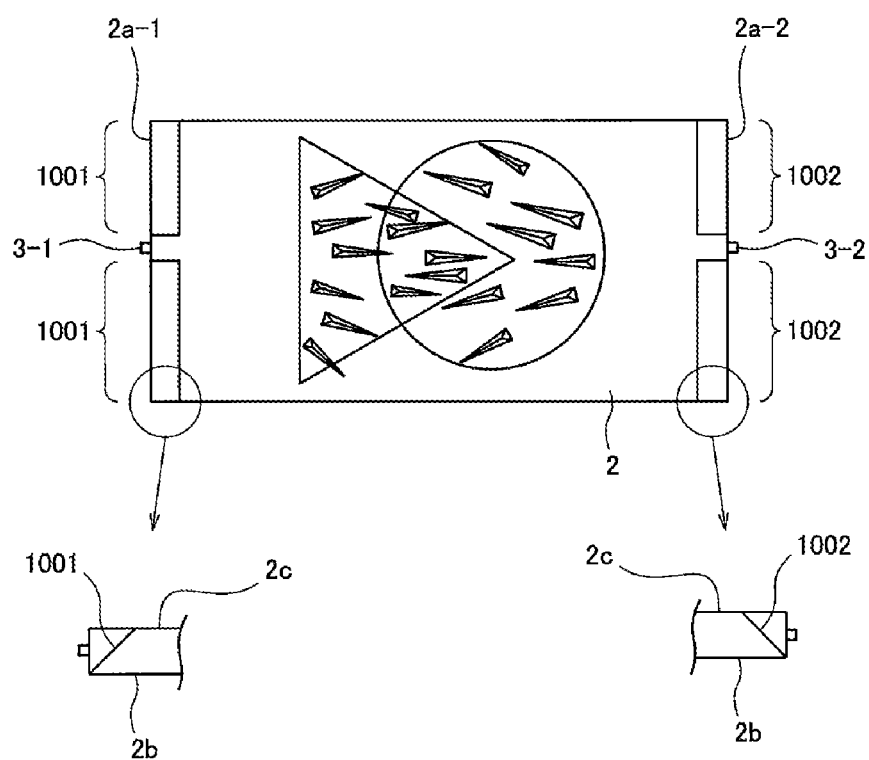
FIG. 10B is a schematic front view of a light guide plate according to still another modification.

FIGS. 10A and 10B are schematic front views of a light guide plate according to still another modification. In the modification shown in FIG. 10A, an incoming surface 2a-1 of the light guide plate 2 is formed with an absorption layer coated with a material that absorbs light in an area 1001 in which light from the light source 3-1 does not enter. Similarly, an incoming surface 2a-2 of the light guide plate 2 is formed with an absorption layer coated with a material that absorbs light in an area 1002 in which light from the light source 3-2 does not enter. These absorption layers are examples of layers that suppress reflection of light propagating through the light guide plate 2. Therefore, light which is emitted from the light source 3-1, propagates through the light guide plate 2, and reaches the area 1002 of the incoming surface 2a-2 is absorbed by the absorption layer. Similarly, light which is emitted from the light source 3-2, propagates through the light guide plate 2, and reaches the area 1001 of the incoming surface 2a-1 is absorbed by the absorption layer. This configuration can prevent light from the light source from being reflected by any of the prisms after being reflected by the incoming surface on the side opposite the incoming surface through which the light enters the light guide plate 2 and being directed to the viewer.

In the area 1001 of the incoming surface 2a-1 and the area 1002 of the incoming surface 2a-2, an antireflection coating layer may be formed instead of applying a light absorbing material. These antireflection coating layers are other examples of layers that suppress reflection of light propagating through the light guide plate 2. In this case as well, light propagating through the light guide plate 2 and reaching the antireflection coating layer is emitted from the light guide plate 2 without being reflected, so that the same effect can be obtained.

In the modification shown in FIG. 10B, the area 1001 in which light from the light source 3-1 does not enter in the incoming surface 2a-1 of the light guide plate 2 is tapered toward the outgoing surface 2c or the diffusion surface 2b. Similarly, the area 1002 in which light from the light source 3-2 does not enter in the incoming surface 2a-2 of the light guide plate 2 is tapered toward the outgoing surface 2c or the diffusion surface 2b. Therefore, light emitted from the light source 3-1, propagating through the light guide plate 2, and reaching the area 1002 of the incoming surface 2a-2 is reflected by the incoming surface 2a-2, and then emitted toward the back side or front side of the light guide plate 2. Similarly, light emitted from the light source 3-2, propagating through the light guide plate 2, and reaching the area 1001 of the incoming surface 2a-1 is reflected by the incoming surface 2a-1, and then emitted toward the back side or front side of the light guide plate 2. This configuration can prevent light from the light source from being reflected by any of the prisms after being reflected by the incoming surface on the side opposite the incoming surface through which the light enters the light guide plate 2 and being directed to the viewer.

Figure 11:
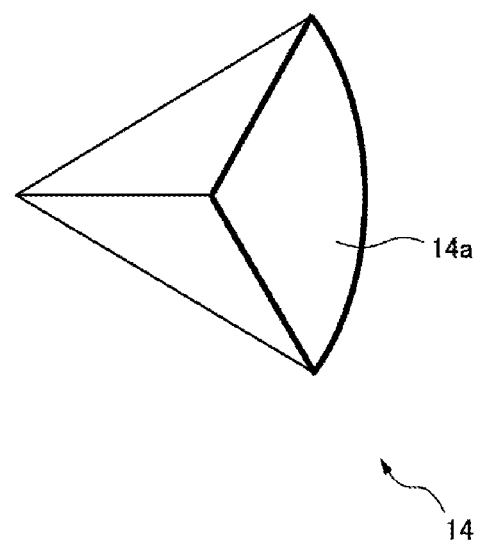
FIG. 11 is a schematic front view of a prism formed on a light guide plate according to still another modification.

FIG. 11 is a schematic front view of a prism formed on a light guide plate according to still another modification. A prism 14 according to this modification is different from the prism 11 according to the above-described embodiment in that a reflective surface 14*a* of the prism 14 is formed in a curved surface having a convex surface. Thus, the direction of reflection changes depending on the position where light emitted from the light source and propagating through the light guide plate enters the reflective surface 14*a*, so that the range in which the viewer can view light emitted from the light guide plate 2 is widened. Therefore, the viewing angle at which the pattern corresponding to the light source that is turned on can be viewed is widened.

Further, even when the collimating lens is not provided and each light source has one light emitting element as in the modification shown in FIG. 5, it is possible to prevent the reflective surface 14*a* from glaring in a dot shape.

Figure 12A:
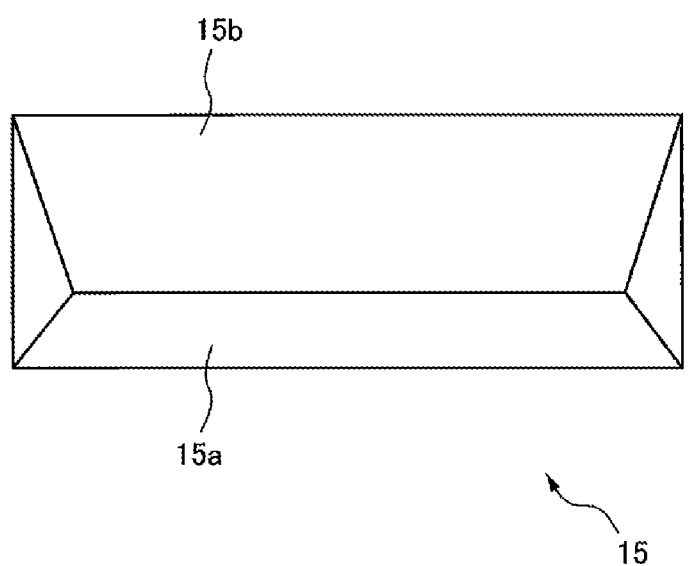
FIG. 12A is a schematic front view of a prism formed on a light guide plate according to still another modification.
Figure 12B:
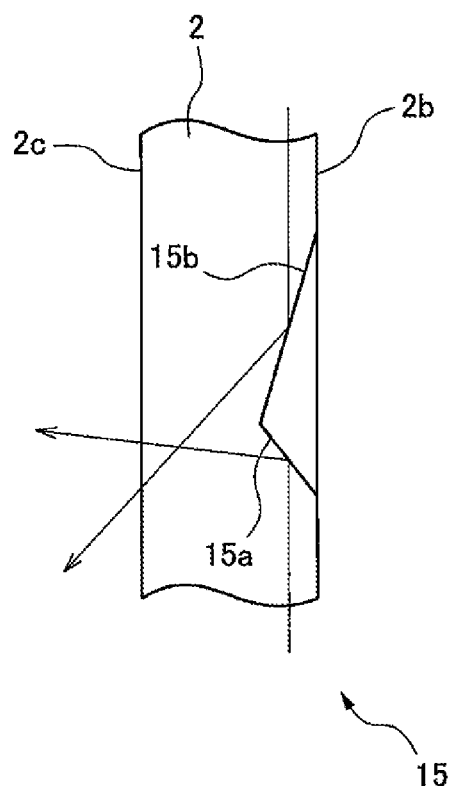
FIG. 12B is a schematic side view of the prism according to the modification.

FIG. 12A is a schematic front view of a prism formed on a light guide plate according to still another modification, and FIG. 12B is a schematic side view of the prism according to this modification. In this modification, a prism 15 is formed as a triangular prism groove on the diffusion surface 2*b* of the light guide plate. One of the two inclined surfaces of the prism 15 is formed as a reflective surface 15*a* that reflects light from the corresponding light source toward a direction outside a prescribed range of angles with reference to the direction normal to the outgoing surface, and the other of the two inclined surfaces is formed as a diffusion surface 15*b* that reflects light from another light source toward a direction different from the direction in which a viewer is positioned. In this modification, the prism 15 is formed so that the inclination angle of the diffusion surface 15*b* is smaller than the inclination angle of the reflective surface 15*a*. Therefore, the angle between the direction of light reflected by the diffusion surface 15*b* and the direction normal to the outgoing surface 2*c* of the light guide plate 2 is greater than the angle between the direction of light reflected by the reflective surface 15*a* and the direction normal to the outgoing surface 2*c* of the light guide plate 2. Therefore, the light reflected by the diffusion surface 15*b* is not viewed by a viewer positioned on the front side of the light guide plate 2, or is totally reflected by the outgoing surface 2*c* of the light guide plate 2 and is not emitted from the light guide plate 2.

Therefore, even when the prism according to this modification is used, the display device can reduce the visibility of patterns other than the pattern corresponding to the light source that emits light in the plurality of patterns.

According to still another modification, in order to display a pattern having gradation by changing the brightness of the pattern for each local area, the size of the reflective surface of each prism may be changed for each local area. For example, the prisms may be arrayed such that the prism disposed in a brighter region in the pattern has a greater reflective surface.

Alternatively, in order to display a pattern having gradation, the arrangement density of prisms may be changed for each local area. For example, the prisms may be arrayed such that the arrangement density of the prisms is increased in a brighter region of the pattern.

Figure 13:
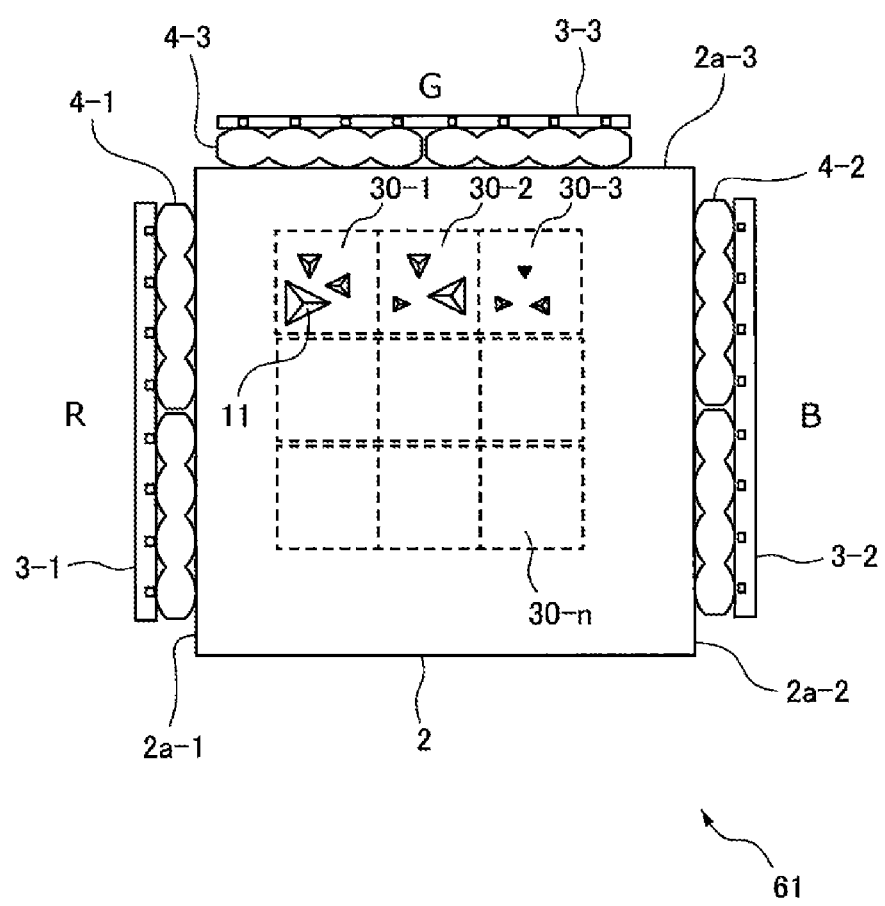
FIG. 13 is a schematic front view of a display device according to still another modification.

FIG. 13 is a schematic front view of a display device according to still another modification. Note that a storage and a controller are not shown in FIG. 13. In this modification, a display device 61 includes three light sources 3-1 to 3-3 disposed to respectively face incoming surfaces 2*a*-1 to 2*a*-3 formed on three of four side surfaces of the light guide plate 2 with collimating lenses 4-1 to 4-3 therebetween. Light emitted from the light sources 3-1 to 3-3 is collimated by collimating lenses 4-1 to 4-3, and then enters the light guide plate 2 through the incoming surfaces 2*a*-1 to 2*a*-3.

In this modification, the colors of light emitted from the light sources 3-1 to 3-3 are different from each other. For example, the light source 3-1 emits red light, the light source 3-2 emits blue light, and the light source 3-3 emits green light. For example, the controller 6 turns on all the light sources 3-1 to 3-3 simultaneously. A region for displaying the pattern of the light guide plate 2 is divided into a plurality of blocks 30-1 to 30-*n* (n is an integer of 2 or more). In the illustrated example, each block is rectangular, but each block is not limited to be rectangular, and may have any shape such as a triangle, pentagon, hexagon, circle, or fan shape. Moreover, the shape and size of the individual block may be the same or different from each other.

Each of the blocks 30-1 to 30-*n* can be regarded as one pixel constituting the pattern and serving as a unit for adjusting the emission color, and within each block, a plurality of prisms 11 is arrayed so that the reflective surfaces face one or more of the light sources 3-1 to 3-3. The arrangement density of the prisms having reflective surfaces facing the corresponding light sources or the size of the reflective surface is adjusted according to the emission color of each block. For example, suppose that the light emission color of the block 30-1 has relatively many red components and relatively few blue components and green components (for example, it is pink or orange). In this case, in the plurality of prisms 11 arrayed in the block 30-1, the number of prisms that are arrayed so that the reflective surfaces face the light source 3-1 is relatively large, or the reflective surfaces of the prisms are increased. On the other hand, the number of prisms that are arrayed so that the reflective surfaces face the light source 3-2 or the light source 3-3 is relatively small, or the reflective surfaces of the prisms are decreased. Suppose that the light emission color of the block 30-2 has relatively many blue components and relatively few red components and green components (for example, it is purple). In this case, in the plurality of prisms 11 arrayed in the block 30-2, the number of prisms that are arrayed so that the reflective surfaces face the light source 3-2 is relatively large, or the reflective surfaces of the prisms are increased. On the other hand, the number of prisms that are arrayed so that the reflective surfaces face the light source 3-1 or the light source 3-3 is relatively small, or the reflective surfaces of the prisms are decreased.

Suppose that the emission color of the block 30-3 is white, and the brightness of the block 30-3 is lower than that of the block 30-1 and the block 30-2. In this case, in the block 30-3, the numbers of prisms that are arrayed so that the reflective surfaces face the corresponding one of the light sources 3-1 to 3-3 or the sizes of the reflective surfaces of the prisms are equal to each other. However, the number of the prisms 11 arrayed in the block 30-3 is smaller, or the size of the reflective surfaces of the prisms 11 arrayed in the block 30-3 is smaller as compared with the block 30-1 and the block 30-2.

According to this modification, the display device 61 can change the emission color for each block, and therefore can display a full color pattern.

According to still another modification, in order to make the displayed pattern glitteringly bright, each prism may be arrayed such that the angle between the direction in which the prism faces the light source and the reflective surface is randomly changed for each prism within a prescribed range of angles. In that case, each prism may be rotated or the prism may be formed so that only the reflective surface rotates. The prescribed range of angles only has to be set according to the range of angles in which the viewer can view the pattern with reference to the direction normal to the outgoing surface of the light guide plate. For example, it only has to be set to a range from about ±5° to about ±10°.

Figure 14:
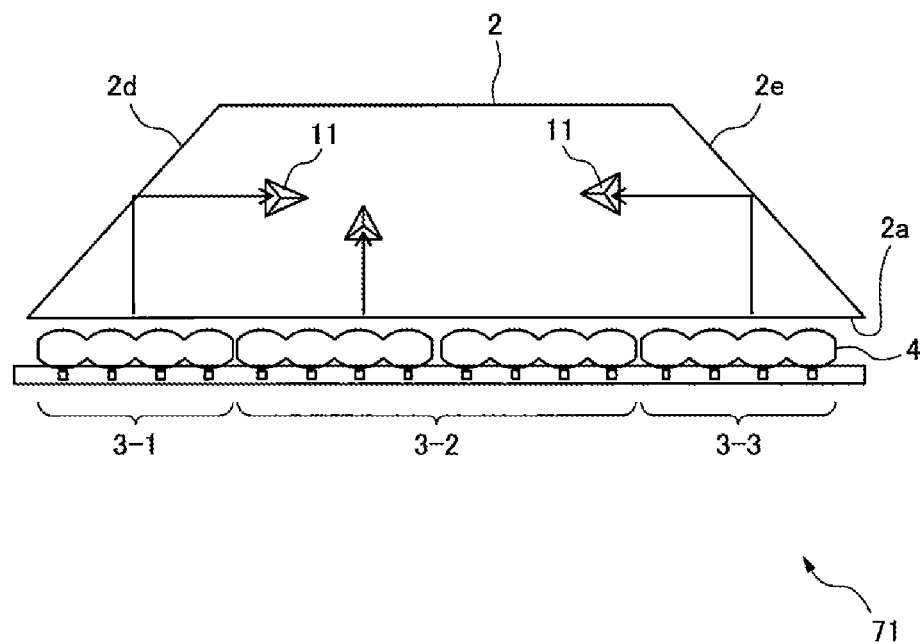
FIG. 14 is a schematic front view of a display device according to still another modification.

FIG. 14 is a schematic front view of a display device 71 according to still another modification. Note that a storage and a controller are not shown in FIG. 14. The display device 71 according to this modification is different from the display device 1 shown in FIG. 1 in the shape of the light guide plate. In the display device 71, one of the side surfaces of the light guide plate 2 is formed as an incoming surface 2a. Three light sources 3-1 to 3-3 are arranged in line along the longitudinal direction of the incoming surface 2a. A collimating lens 4 is disposed between the light sources 3-1 to 3-3 and the incoming surface 2a. Accordingly, light emitted from the light sources 3-1 to 3-3 is collimated by the collimating lens 4, and the collimated light enters the light guide plate 2 through the incoming surface 2a.

In this modification, the light guide plate 2 is formed in a trapezoidal shape, and the incoming surface 2a is formed on a side surface corresponding to the bottom surface of the trapezoid. Further, two side surfaces 2d and 2e of the light guide plate 2 which are adjacent to the incoming surface 2a and correspond to the inclined surface of the trapezoid are formed as reflective surfaces, respectively. The reflective surface 2d totally reflects light from the light source 3-1 propagating through the light guide plate 2 and changes the propagation direction of the light. For example, if the angle between the incoming surface 2a and the reflective surface 2d is 45°, light from the light source 3-1 totally reflected by the reflective surface 2d propagates in a direction substantially parallel to the longitudinal direction of the incoming surface 2a. Therefore, each prism 11 forming a pattern displayed by the light source 3-1 only has to be formed so that the reflective surface faces the reflective surface 2d.

Similarly, the reflective surface 2e totally reflects light from the light source 3-3 propagating through the light guide plate 2 and changes the propagation direction of the light. For example, if the angle between the incoming surface 2a and the reflective surface 2e is 45°, light from the light source 3-3 totally reflected by the reflective surface 2e propagates in a direction substantially parallel to the longitudinal direction of the incoming surface 2a. Therefore, each prism 11 forming a pattern displayed by the light source 3-3 only has to be formed so that the reflective surface faces the reflective surface 2e.

Thus, even if the patterns corresponding to the light sources 3-1 to 3-3 overlap each other, the display device 71 can display the pattern corresponding to the light source to be turned on by switching the light source to be turned on by the controller 6. Further, according to this modification, even when a space for arranging a light source can be ensured only on one side of the light guide plate, the display device can switch the display of a plurality of patterns and reduce the visibility of the pattern that is not displayed.

Figure 15:
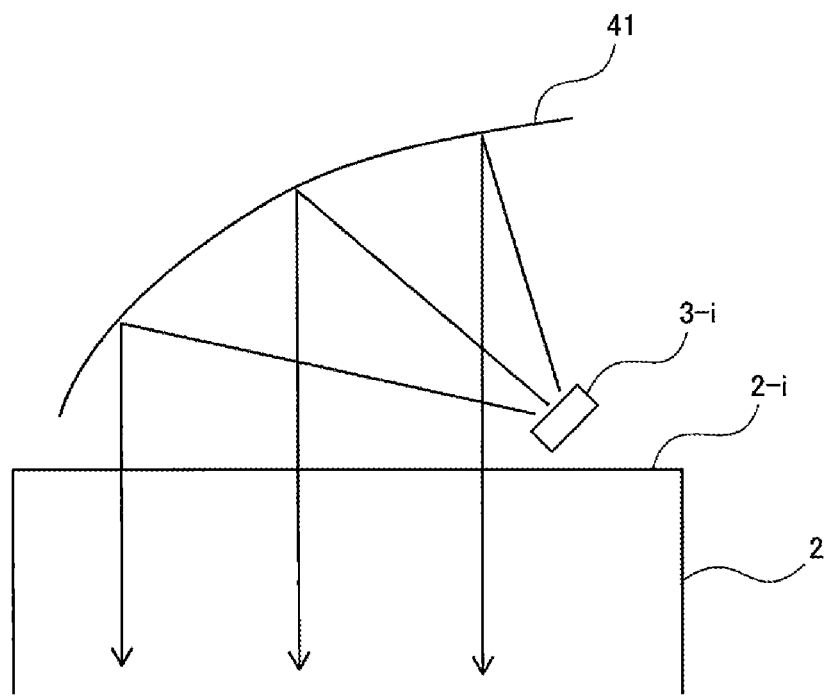
FIG. 15 is a diagram showing an example of a mirror used instead of a collimating lens.

In the display device according to the embodiment or the modifications described above, a mirror that collimates light emitted from the light source may be used instead of the collimating lens. FIG. 15 shows an example of such a mirror.

The mirror 41 is formed to have a paraboloidal surface, for example, and a light source 3-i (i=1, 2, . . . ) is disposed at the focal point of the mirror 41. Thus, light emitted from the light source 3-i is reflected by the mirror 41, converted into parallel light, and enters the light guide plate 2 through the incoming surface 2-i of the light guide plate 2.

According to this modification, as compared with the collimating lens, the mirror 41 can reduce more the aberration superimposed on the light that is collimated, thereby being capable of further preventing light collimated and entering the light guide plate 2 from spreading along the longitudinal direction of the incoming surface 2-i.

The display device according to the above-described embodiment or modifications may be mounted on a game machine such as a pinball game machine or a slot game machine.

Figure 16:
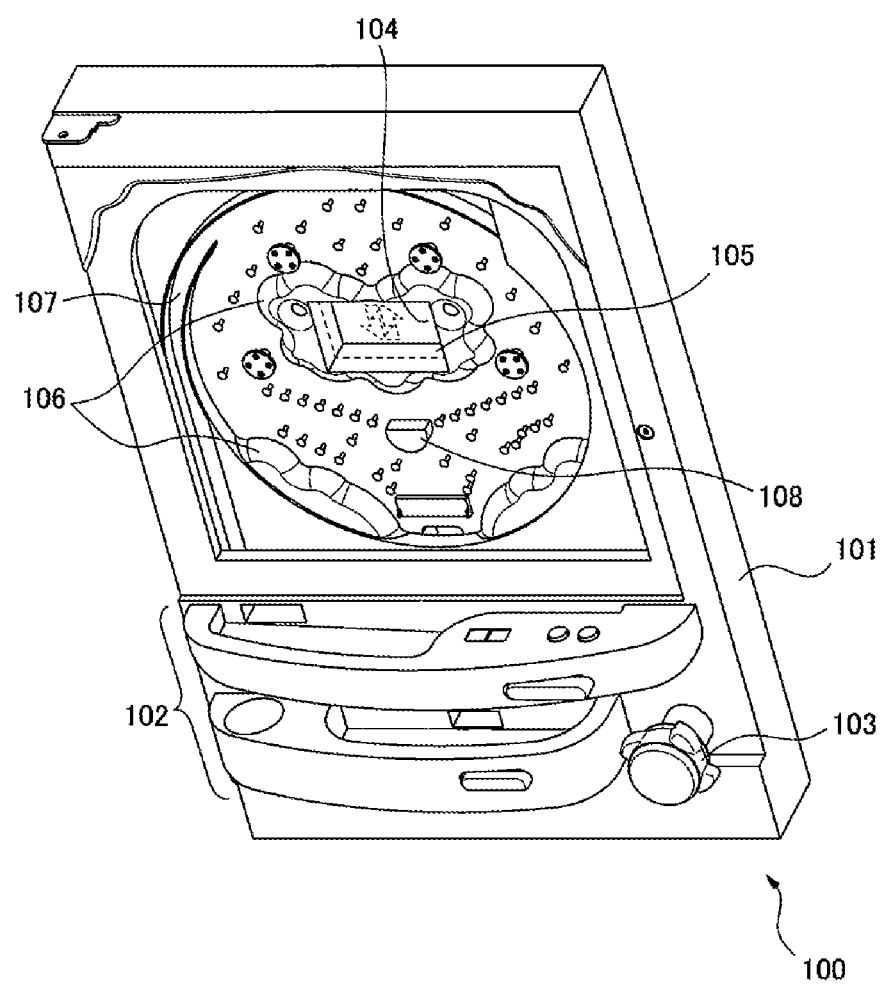
FIG. 16 is a schematic perspective view of a pinball game machine having the display device according to the embodiment or the modifications as seen from a player side.

FIG. 16 is a schematic perspective view of a pinball game machine provided with the display device according to the embodiment or the modifications as seen from a player side. As shown in FIG. 16, the pinball game machine 100 is provided with a game board 101 which is a main body of the game machine provided in most of a region from the upper part to the central part, a ball receiver 102 disposed below the game board 101, an operation unit 103 having a handle, a liquid crystal display 104 provided at a substantially central part of the game board 101, and a display device 105 disposed in front of the liquid crystal display 104.

The pinball game machine 100 also has accessories 106 arranged below the game board 101 or around the display device 105 on the front surface of the game board 101 in order to add excitement to the game. A rail 107 is disposed on the side of the game board 101. Many obstacle nails (not shown) and at least one prize-winning device 108 are provided on the game board 101.

The operation unit 103 launches a game ball with a predetermined force from a launching device (not shown) according to an amount of rotation of the handle operated by a player. The launched game ball moves upward along the rail 107 and falls between a large number of obstacle nails. When a sensor (not shown) detects that a game ball has entered any prize-winning device 108, a main control circuit (not shown) provided on the back of the game board 101 causes a ball discharge device (not shown) to discharge, into the ball receiver 102, a predetermined number of game balls according to the prize-winning device 108 into which the game ball enters. Further, the main control circuit drives the liquid crystal display 104 and the display device 105 via an effect CPU (not shown) provided on the back of the game board 101. Then, the effect CPU transmits to the display device 105 a control signal including turn-on control information corresponding to the game state.

The display device 105 is an example of the display device according to the above-described embodiment or modifications, and is attached to the game board 101 so that the outgoing surface of the light guide plate faces the player. Then, the controller of the display device 105 sequentially changes the light source to be turned on according to the turn-on control information included in the control signal from the effect CPU, so that the player can see a pattern that dynamically changes in response to the light source which is turned on, as well as an image displayed in the liquid crystal display 104. Alternatively, the controller may turn off all the light sources so that the player can view only an image displayed on the liquid crystal display 104 via the light guide plate.

As described above, those skilled in the art can make various modifications in accordance with the embodiment to be implemented within the scope of the present invention.

DESCRIPTION OF SYMBOLS 1, 51, 61, 71 display device
2 light guide plate
2a, 2a-1 to 2a-4 incoming surface
2b diffusion surface
2c outgoing surface
2d, 2e reflective surface
3-1 to 3-4 light source
11, 11-1 to 11-6, 12 to 15 prism
11a, 12a, 12b, 13a to 13d, 14a, 15a reflective surface
11b, 11c, 12c, 14b, 15b diffusion surface
21 to 24 pattern
30-1 to 30-n block
4, 4-1 to 4-4 collimating lens
5 storage
6 controller
100 pinball game machine
101 game board
102 ball receiver
103 operation unit
104 liquid crystal display
105 display device
106 accessory
107 rail
108 prize-winning device

The invention claimed is:

1. A display device comprising:
a light guide plate that is formed of a transparent member, is configured to display a plurality of patterns, and comprises at least one incoming surface;
a plurality of light sources arranged to face any of the at least one incoming surface; and
a controller configured to control on and off of the plurality of light sources,
wherein the light guide plate comprises
a plurality of prisms that is arrayed along each pattern in the plurality of patterns on one surface of the light guide plate and reflects light emitted from a light source corresponding to the pattern from among the plurality of light sources and entering the light guide plate through the incoming surface toward a direction within a prescribed range of angles with reference to a direction normal to an other surface of the light guide plate, and
each of the plurality of prisms is formed as a triangular pyramid groove in the one surface of the light guide plate, wherein one of inclined surfaces of the triangular pyramid groove is formed as a reflective surface configured to reflect light that is emitted from the light source corresponding to a pattern along which the prism is arrayed in the plurality of patterns and that enters the light guide plate toward the direction within the prescribed range of angles, and another inclined surface of the triangular pyramid groove is formed as a diffusion surface configured to reflect light that is emitted from a light source different from the light source corresponding to the pattern along which the prism is arrayed in the plurality of patterns and that enters the light guide plate toward an outside of the prescribed range of angles,
the at least one incoming surface of the light guide plate comprises a first incoming surface formed on one side surface of the light guide plate and a second incoming surface formed on a side surface of the light guide plate opposite to the first incoming surface,
the plurality of light sources comprises a first light source arranged to face the first incoming surface and a second light source arranged to face the second incoming surface,
the plurality of patterns comprises a first pattern displayed when the first light source is turned on, and a second pattern displayed when the second light source is turned on, and
prisms included in the plurality of prisms and arrayed along the first pattern are formed such that an angle between the diffusion surface and the one surface of the light guide plate is increased with distance from the first light source.

2. The display device according to claim 1,
wherein the prisms included in the plurality of prisms and arrayed along the first pattern are formed such that an angle between the diffusion surface and the second incoming surface is decreased with distance from the first light source on the one surface of the light guide plate.

3. The display device according to claim 1,
wherein
a layer configured to suppress reflection of light propagating through the light guide plate is formed in a region of the first incoming surface that does not transmit light from the first light source.

4. The display device according to claim 1,
wherein
a region of the first incoming surface that does not transmit light from the first light source is tapered with respect to the one surface or the other surface of the light guide plate.

5. The display device according to claim 1,
wherein
the display device further comprises, between the first light source and the first incoming surface, a first collimating lens configured to collimate light emitted from the first light source in at least a longitudinal direction of the first incoming surface,
the first collimating lens is arranged such that an optical axis of the first collimating lens is inclined with respect to a direction normal to the first incoming surface, and
the first light source comprises a light emitting element disposed on the optical axis of the first collimating lens.

6. A light guide plate that is formed of a transparent member, is configured to display a plurality of patterns, and comprises at least one incoming surface, the light guide plate comprising:
a plurality of prisms that is arrayed along each pattern in the plurality of patterns on one surface of the light guide plate and reflects light which is emitted from a light source corresponding to the pattern from among a plurality of light sources arranged to face any of the at least one incoming surface and which enters the light guide plate through the incoming surface toward a direction within an prescribed range of angles with reference to a direction normal to the other surface of the light guide plate,
wherein each of the plurality of prisms is formed as a triangular pyramid groove in the one surface of the light guide plate, wherein one of inclined surfaces of the triangular pyramid groove is formed as a reflective surface configured to reflect light that is emitted from the light source corresponding to a pattern along which the prism is arrayed in the plurality of patterns and that enters the light guide plate toward the direction within the prescribed range of angles, and another inclined surface of the triangular pyramid groove is formed as a diffusion surface configured to reflect light that is emitted from a light source different from the light source corresponding to the pattern along which the prism is arrayed in the plurality of patterns and that enters the light guide plate toward an outside of the prescribed range of angles, the at least one incoming surface of the light guide plate comprises a first incoming surface formed on one side surface of the light guide plate and a second incoming surface formed on a side surface of the light guide plate opposite to the first incoming surface, the plurality of light sources comprises a first light source arranged to face the first incoming surface and a second light source arranged to face the second incoming surface, the plurality of patterns comprises a first pattern displayed when the first light source is turned on, and a second pattern displayed when the second light source is turned on, and prisms included in the plurality of prisms and arrayed along the first pattern are formed such that an angle between the diffusion surface and the one surface of the light guide plate is increased with distance from the first light source.

\* \* \* \* \*